United States Patent
Noonan et al.

(10) Patent No.: US 10,942,718 B2
(45) Date of Patent: *Mar. 9, 2021

(54) SYSTEMS AND/OR METHODS FOR TYPE INFERENCE FROM MACHINE CODE

(71) Applicant: GrammaTech, Inc., Ithaca, NY (US)

(72) Inventors: Matthew Noonan, Ithaca, NY (US);
Alexey Loginov, Ithaca, NY (US);
David Cok, Rochester, NY (US)

(73) Assignee: GRAMMATECH, INC, Ithaca, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/564,858

(22) Filed: Sep. 9, 2019

(65) Prior Publication Data
US 2019/0391797 A1 Dec. 26, 2019

Related U.S. Application Data

(63) Continuation of application No. 15/393,463, filed on Dec. 29, 2016, now Pat. No. 10,423,397.

(51) Int. Cl.
*G06F 8/41* (2018.01)
*G06F 8/74* (2018.01)
*G06F 8/53* (2018.01)
*G06F 11/36* (2006.01)

(52) U.S. Cl.
CPC ............... *G06F 8/53* (2013.01); *G06F 8/437* (2013.01); *G06F 8/74* (2013.01); *G06F 11/3668* (2013.01)

(58) Field of Classification Search
CPC ..... G06F 8/53; G06F 8/437; G06F 8/74; G06F 11/3668
See application file for complete search history.

(56) References Cited

U.S. PATENT DOCUMENTS

| | | |
|---|---|---|
| 5,339,419 A | 8/1994 | Chan |
| 5,488,727 A | 1/1996 | Agrawal |
| 6,202,202 B1 | 3/2001 | Steensgaard |

(Continued)

OTHER PUBLICATIONS

Andreas Kind et al., "A Practical Approach to Type Inference for EuLisp", [Online], pp. 1-17, [Retrieved from Interent on Sep. 28, 2020], <http://scholar.google.com/scholar_url?url=https%3A%2F%2Flink.springer.com%2Fcontent%2Fpdf> (Year: 1993).*

(Continued)

*Primary Examiner* — Ziaul A Chowdhury
(74) *Attorney, Agent, or Firm* — Nixon & Vanderhye PC

(57) ABSTRACT

Systems, methods and computer readable medium described herein relate to techniques for automatic type inference from machine code. An example technique includes receiving a machine code of a program, generating an intermediate representation of the machine code, generating a plurality of type constraints from the intermediate representation, generating one or more inferred types based at least upon the plurality of type constraints, converting the generated inferred types to C types, updating the intermediate representation by applying the inferred types to the intermediate representation, and outputting said inferred types, said converted C types, and/or at least a portion of the updated intermediate representation.

20 Claims, 21 Drawing Sheets

(56) References Cited

U.S. PATENT DOCUMENTS

| | | | |
|---|---|---|---|
| 8,171,453 B2* | 5/2012 | Meijer | G06F 8/436 |
| | | | 717/114 |
| 8,713,515 B1* | 4/2014 | Biggerstaff | G06F 8/72 |
| | | | 717/104 |
| 8,789,012 B1 | 7/2014 | Tolle | |
| 9,081,893 B2* | 7/2015 | Christensen | G06F 9/44589 |
| 9,135,027 B1 | 9/2015 | Basumallik et al. | |
| 9,329,845 B2* | 5/2016 | Cui | G06F 8/434 |
| RE46,380 E | 4/2017 | Schaefer | |
| 2004/0205742 A1 | 10/2004 | Das | |
| 2006/0005138 A1 | 1/2006 | Rohwedder | |
| 2006/0048095 A1 | 3/2006 | Meijer | |
| 2006/0242628 A1 | 10/2006 | Plesko et al. | |
| 2008/0208774 A1* | 8/2008 | Kim | G06N 5/025 |
| | | | 706/12 |
| 2008/0282238 A1 | 11/2008 | Meijer | |
| 2008/0320453 A1 | 12/2008 | Meijer et al. | |
| 2009/0144690 A1 | 6/2009 | Spackman | |
| 2009/0265688 A1* | 10/2009 | Govereau | G06F 9/449 |
| | | | 717/124 |
| 2010/0169868 A1 | 7/2010 | Condit | |
| 2010/0242017 A1* | 9/2010 | Stenberg | G06F 8/30 |
| | | | 717/111 |
| 2011/0314459 A1 | 12/2011 | Husbands | |
| 2012/0005660 A1 | 1/2012 | Goetz | |
| 2013/0205286 A1 | 8/2013 | Barraclough | |
| 2014/0282443 A1 | 9/2014 | Hoban et al. | |
| 2015/0186116 A1 | 7/2015 | Tozawa | |
| 2016/0004548 A1 | 1/2016 | Suzuki | |
| 2016/0299747 A1 | 10/2016 | Lattner | |
| 2017/0131982 A1 | 5/2017 | Cimadamore | |
| 2017/0147303 A1 | 5/2017 | Amy | |
| 2018/0004489 A1* | 1/2018 | Proctor | G06F 40/14 |
| 2018/0173506 A1 | 6/2018 | Hodaei | |
| 2018/0189042 A1 | 7/2018 | Noonan | |

OTHER PUBLICATIONS

Lu Lunjin et al., "Backward Type Inference Generalises Type Checking", [Online], pp. 1-17, [Retrieved from Interent on Sep. 28, 2020], <https://kar.kent.ac.uk/13743/2/BackLu1.pdf> (Year: 2002).*

Alexander Aiken et al. "Type Inclusion Constraints and Type Inference", [Online], pp. 31-41, [Retrieved from Internet on Jan. 13, 2021], <https://dl.acm.org/doi/pdf/10.1145/165180.165188> (Year: 1993).*

Calvin Loncaric et al., "A Practical Framework for Type Inference Error Explanation", [Online], pp. 781-799, [Retrieved from Internet on Jan. 13, 2021], <https://dl.acm.org/doi/pdf/10.1145/3022671.2983994> (Year: 2016).*

Brian Hackett et al. "Fast and Precise Hybrid Type Inference for JavaScript", [Online], pp. 239-249, [Retrieved from Internet on Jan. 13, 2021], <https://dl.acm.org/doi/pdf/10.1145/2345156.2254094> (Year: 2012).*

Jens Palsberg et al., "Object-Oriented Type Inference", [Online], pp. 146-161,[Retrieved from Internet on Jan. 13, 2021], <https://dl.acm.org/doi/pdf/10.1145/118014.117965> (Year: 1991).*

Extended European Search Report dated Jul. 13, 2020 in corresponding European Application No. 17886513.5, 13 pages.

Ole Agesen, "Constraint-Based Type Inference and Parametric Polymorphism," in First International Static Analysis Symposium, SAS '94, Springer-Verlag LNCS 864, retrieved Dec. 21, 2016, 23 pages.

Roberto M. Amadio et al., "Subtyping Recursive Types," ACM Transactions on Programming Languages and Systems, 15(4), retrieved Dec. 21, 2016, pp. 575-631.

Lars Ole Andersen, "Program Analysis and Specialization for the C Programming Language," PhD Thesis—University of Cophenhagen, May 1994, 311 pages.

Gogul Balakrishnan et al., "Analyzing Memory Accesses in x86 Executables," Proceedings of the 14th International Conference on Compiler Construction, Apr. 4, 2005, 18 pages.

Arnaud Carayol et al., "Saturation Algorithms for Model-Checking Pushdowns Systems," retrieved Dec. 21, 2016, 24 pages.

Didier Caucal, "On the Regular Structure of Prefix Rewriting," Theoretical Computer Science 106 (1992), Nov. 1992, pp. 61-86.

"Scalable Variable and Data Type Detection in a Binary Rewriter," retrieved Dec. 21, 2016, 10 pages.

Jeffrey S. Foster et al., "Flow-Insensitive Type Qualifiers," ACM Transactions on Programming Languages and Systems, Nov. 2006, 53 pages.

Denis Gopan et al., "Data-Delineation in Software Binaries and its Application to Buffer-Overrun Discovery," Proceedings of the 37th International Conference on Software Engineering, May 16, 2015, 11 pages.

David Greenfieldboyce et al., "Type Qualifier Inference for Java," Proceedings of the 22nd Annual ACM SIGPLAN Conference on Object-Oriented Programming Systems and Applications, Oct. 2007, 16 pages.

Dexter Kozen et al., "Efficient Recursive Subtyping," Mathematical Structures in Computer Science, retrieved Dec. 21, 2016, 19 pages.

JongHyup Lee et al., "TIE: Principled Reverse Engineering of Types in Binary Programs," retrieved Dec. 21, 2016, 18 pages.

Junghee Lim et al., "TSL: A System for Generating Abstract Interpreters and its Application to Machine-Code Analysis," Apr. 2013, 65 pages.

Zhiqiang Lin et al., "Automatic Reverse Engineering of Data Structures from Binary Execution," retrieved Dec. 21, 2016, 18 pages.

Simon Marlow et al., "Faster Laziness Using Dynamic Pointer Tagging," Proceedings of the 12th ACM SIGPLAN International Conference on Functional Programming, Oct. 1, 2007, 12 pages.

Laurent Mauborgne et al., "Trace Partitioning in Abstract Interpretation Based Static Analyzers," Proceedings of the 14th European Conference on Programming Languages and Systems, Apr. 4, 2005, 16 pages.

Matthew Noonan et al., "Polymorphic Type Inference for Machine Code," Proceedings of the 37th ACM SIGPLAN CONFERENCE on Programming Language Decision and Implementation, Jun. 13, 2016, 31 pages.

Jens Palsberg et al., "A Type System Equivalent to Flow Analysis," ACM Transactions on Programming Languages and Systems, Jul. 1995, 28 pages.

Jens Palsberg et al., "Basic Research in Computer Science (BRICS)—Type Inference with Non-Structural Subtyping," Jun. 1995, 25 pages.

Francois Pottier et al., "The Essence of ML Type Inference," retrieved Dec. 21, 2016, 144 pages.

Jakob Rehof et al., "Type-Based Flow Analysis: From Polymorphic Subtyping to CFL-Reachability," Proceedings of the 28th ACM SIGPLAN-SIGACT Symposium on Principles of Programming Languages, Jan. 2001, 13 pages.

Ed Robbins et al., "Theory Propagation and Rational-Trees," Proceedings of the 15th Symposium on Principles and Practice of Declarative Programming, Sep. 16, 2013, 12 pages.

Matthew Robertson, "A Brief History of InvSqrt," The University of New Brunswick—Thesis, Apr. 24, 2012, 57 pages.

Edward J. Schwartz et al., "Native x86 Decompilation Using Semantics-Preserving Structural Analysis and Iterative Control-Flow Structuring," 22nd USENIX Security Symposium, Aug. 14, 2013, 17 pages.

Michael Siff et al., "Copy with Type Casts in C," ACM SIGSOFT Software Engineering Notes, Nov. 1999, 26 pages.

Asia Slowinska et al., "Howard: A Dynamic Excavator for Reverse Engineering Data Structures," In Network and Distributed System Security Symposium, retrieved Dec. 21, 2016, 20 pages.

Bjarne Steensgaard, "Points-to Analysis in Almost Linear Time," Proceedings of the 23rd ACM SIGPLAN-SIGACT Symposium on Principles of Programming Languages, Jan. 21, 1996, 10 pages.

Hex-Rays: IDA About, retrieved Dec. 27, 2016, 2 pages. http://www.hex-rays.com/products/ida/.

(56) References Cited

OTHER PUBLICATIONS

J. Richard Bĕchi et al., "Regular Canonical Systems," retrieved Dec. 27, 2016, 21 pp.
Gogul Balakrishnan et al., "CodeSurfer/x86—A Platform for Analyzing x86 Executables," Proceedings of the 14th International Conference on Compiler Construction, Apr. 4, 2005, 5 pages.
Jonathan Eifrig et al., "Sound Polymorphic Type Inference for Objects," Proceedings of the Tenth Annual Conference on Object-Oriented Programming Systems, Languages, and Applications, Oct. 15, 1995, 16 pages.
Zhendong Su et al., "The First-Order Theory of Subtyping Constraints," Proceedings of the 29th ACM SIGPLAN-SIGACT Symposium on Principles of Programming Languages, Jan. 16, 2002, 14 pages.
Manuel Fähndrich et al., "Making Set-Constraint Program Analyses Scale," Jul. 2, 1996, 10 pages.
"Information Technology—Programming Languages 13 Technical Report on C++ Library Extensions," ISO/IEC TR 19768, Nov. 2007, 200 pages.
International Search Report and Written Opinion dated Jan. 5, 2018 in corresponding International Application PCT/US17/56306, 16 pages.
International Preliminary Report on Patentability dated Jul. 2, 2019 in corresponding International Application No. PCT/US17/56306, 6 pages.
Mark P. Jones, "A theory of qualified types", [Online], 1992, pp. 287-306, [Retrieved from Internet on Apr. 22, 2019], <https://link.springer.com/content/pdf/10.1007/3-540-55253-7_17.pdf>.
Naoki Kobayashi et al., "Type-Theoretic Foundations for Concurrent Object-Oriented Programing", [Online], 1994, pp. 31-45, [Retrieved from Internet on Apr. 22, 2019], <http://delivery.acnn.org/10.1145/200000/191088/p31-kobayashi.pdf>.
Qi Tan et al., an Extended Behavioral Type System for Memory-Leak Freedom, [Online], 2016, pp. 1-11, [Retrieved from Internet on Apr. 22, 2019], <http://www.fos.kuis.kyoto-u.ac.jp/-tanki/papers/jssst2016.pdf>.
Aseem Rastogi et al., The Ins and Outs of Gradual Type Inference, [Online], 2012, pp. 481-494, [Retrieved from Interent on Apr. 22, 2019], < http://www.cs.umd.edu/- aseem /grad_ti.pdf>.

* cited by examiner

| Label | Variance | Capability |
|---|---|---|
| .in$_L$ | ⊖ | Function with input in location $L$. |
| .out$_L$ | ⊕ | Function with output in location $L$. |
| .load | ⊕ | Readable pointer. |
| .store | ⊖ | Writable pointer. |
| .σN@k | ⊕ | Has $N$-bit field at offset $k$. |

FIG. 4

*Derived Type Variable Formation*

$$\frac{\alpha \sqsubseteq \beta}{\text{VAR } \alpha} \text{ (T-LEFT)}$$

$$\frac{\alpha \sqsubseteq \beta}{\text{VAR } \beta} \text{ (T-RIGHT)}$$

$$\frac{\alpha \sqsubseteq \beta, \ \text{VAR } \alpha.\ell}{\text{VAR } \beta.\ell} \text{ (T-INHERITL)}$$

$$\frac{\alpha \sqsubseteq \beta, \ \text{VAR } \beta.\ell}{\text{VAR } \alpha.\ell} \text{ (T-INHERITR)}$$

$$\frac{\text{VAR } \alpha.\ell}{\text{VAR } \alpha} \text{ (T-PREFIX)}$$

*Subtyping*

$$\frac{\text{VAR } \alpha}{\alpha \sqsubseteq \alpha} \text{ (S-REFL)}$$

$$\frac{\alpha \sqsubseteq \beta, \ \beta \sqsubseteq \gamma}{\alpha \sqsubseteq \gamma} \text{ (S-TRANS)}$$

$$\frac{\alpha \sqsubseteq \beta, \ \text{VAR } \beta.\ell, \ \langle \ell \rangle = \oplus}{\alpha.\ell \sqsubseteq \beta.\ell} \text{ (S-FIELD}\oplus\text{)}$$

$$\frac{\alpha \sqsubseteq \beta, \ \text{VAR } \beta.\ell, \ \langle \ell \rangle = \ominus}{\beta.\ell \sqsubseteq \alpha.\ell} \text{ (S-FIELD}\ominus\text{)}$$

$$\frac{\text{VAR } \alpha.\text{load}, \ \text{VAR } \alpha.\text{store}}{\alpha.\text{store} \sqsubseteq \alpha.\text{load}} \text{ (S-POINTER)}$$

FIG. 5

```
include <stdlib.h> struct LL
{
    struct LL * next;
    int handle;
};

int close_last(struct LL * list)
{
    while (list->next != NULL)
    {
        list = list->next;
    }
    return close(list->handle);
}
```

```
close_last:
        push    ebp
        mov     ebp,esp
        sub     esp,8
        mov     edx,dword [ebp+arg_0]
        jmp     loc_8048402
loc_8048400:
        mov     edx,eax
loc_8048402:
        mov     eax,dword [edx]
        test    eax,eax
        jnz     loc_8048400
        mov     eax,dword [edx+4]
        mov     dword [ebp+arg_0],eax
        leave
        jmp     __thunk_.close
```

$\forall F. (\exists \tau. \mathcal{C}) \Rightarrow F$ where $\mathcal{C} =$
$F.\text{in}_{\text{stack0}} \sqsubseteq \tau$
$\tau.\text{load}.\sigma 32@0 \sqsubseteq \tau$
$\tau.\text{load}.\sigma 32@4 \sqsubseteq \text{int} \wedge \#\text{FileHandle}$
$\text{int} \vee \#\text{SuccessZ} \sqsubseteq F.\text{out}_{\text{eax}}$

```
typedef struct {
    Struct_0 * field_0;
    int field_4; // #FileHandle
} Struct_0;

int // #SuccessZ
close_last(const Struct_0 *);
```

FIG. 6

```
.text:08048420                 close_last proc near
.text:08048420 close_last:
.text:08048420                 mov     edx,dword [esp+fd]
                                                        AR_close_last_INITIAL[4:7] <: EDX_8048420_close_last[0:3]
                                                        close_last.in@stack0 <: AR_close_last_INITIAL[4:7]
                                                        EAX_804843F_close_last[0:3] <: close_last.out@eax
.text:08048424                 jmp     loc_8048432
.text:08048426                 db 141, 118, 0, 141, 188, 39
.text:0804842C                 times 4 db 0
.text:08048430
.text:08048430 loc_8048430:
.text:08048430                 mov     edx,eax
                                                        EAX_8048432_close_last[0:3] <: EDX_8048430_close_last[0:3]
.text:08048432
.text:08048432 loc_8048432:
.text:08048432                 mov     eax,dword [edx]
                                                        EDX_8048420_close_last[0:3] <: unknown_loc_106
                                                        EDX_8048430_close_last[0:3] <: unknown_loc_106
                                                        unknown_loc_106.load.32@0 <: EAX_8048432_close_last[0:3]
.text:08048434                 test    eax,eax
.text:08048436                 jnz     loc_8048430
.text:08048438                 mov     eax,dword [edx+4]
                                                        EDX_8048420_close_last[0:3] <: unknown_loc_111
                                                        EDX_8048430_close_last[0:3] <: unknown_loc_111
                                                        unknown_loc_111.load.32@4 <: EAX_8048438_close_last[0:3]
.text:0804843B                 mov     dword [esp+fd],eax
                                                        EAX_8048438_close_last[0:3] <: AR_close_last_8048438[4:7]
.text:0804843F                 jmp     thunk_.close
                                                        AR_close_last_804843B[4:7] <: close:0x804843F.in@stack0
                                                        close:0x804843F.in@stack0 <: #FileDescriptor
                                                        close:0x804843F.in@stack0 <: int
                                                        close:0x804843F.out@eax <: EAX_804843F_close_last[0:3]
                                                        int <: close:0x804843F.out@eax
.text:08048443
.text:08048443 close_last endp
```

Algorithm F.1 Type scheme inference procedure INFERPROCTYPES(CallGraph)
 $T \leftarrow \emptyset$  ▷ $T$ is a map from procedure to type scheme.
 for all $S \in$ POSTORDER(CallGraph.sccs) do
  $\mathcal{C} \leftarrow \emptyset$
  for all $P \in S$ do
   $T[P] \leftarrow \emptyset$
  end for
  for all $P \in S$ do
   $\mathcal{C} \leftarrow \mathcal{C} \cup$ CONSTRAINTS$(P, T)$
  end for
  $\mathcal{C} \leftarrow$ INFERSHAPES$(\mathcal{C}, \emptyset)$
  for all $P \in S$ do
   $\mathcal{V} \leftarrow P.\text{formalIns} \cup P.\text{formalOuts}$
   $Q \leftarrow$ TRANSDUCER$(\mathcal{C}, \mathcal{V} \cup \overline{\Lambda})$
   $T[P] \leftarrow$ TYPESCHEME$(Q)$
  end for
 end for
end procedure procedure CONSTRAINTS$(P, T)$
 $\mathcal{C} \leftarrow \emptyset$
 for all $i \in P.\text{instructions}$ do
  $C \leftarrow C \cup$ ABSTRACTINTERP(TypeInterp, $i$)
  if $i$ calls $Q$ then
   $\mathcal{C} \leftarrow \mathcal{C} \cup$ INSTANTIATE$(T[Q], i)$
  end if
 end for
 return $\mathcal{C}$
end procedure

FIG. 10

```
regUpdate(s, reg, v) =
  let (v', t, c) = v
      (s', m)   = s
      s''   = regUpdate(s', reg, v')
      (u, c') = A(reg, s'')
  in
      ( s'', m ∪ c ∪ { t ⊑ u } )
```

FIG. 11A

```
regAccess(reg, s) =
  let (s', c) = s
      (t, c') = A(reg, s')
  in
      ( regAccess(reg, s'), t, c ∪ c' )
```

FIG. 11B

```
A(reg, s) =
  case reaching-defs(reg, s) of
    { p } → (reg_p, {})
    defs →
        let t = fresh
            c = { reg_p ⊑ t | p ∈ defs }
        in (t, c)
```

FIG. 11C

```
add(v, INT32(n)) =
let (v', t, c) = v in
  ( add(v', INT32(n)), t.+n, c )
```

FIG. 11D

```
add(x, y) =
let (x', t₁, c₁) = x
    (y', t₂, c₂) = y
    t = fresh
in
    ( add(x', y'),
      t,
      c₁ ∪ c₂ ∪ { Add(t₁, t₂, t) } )
```

FIG. 11E

```
memAccess_N(s, a) =
  let (s_0, c_s) = s
      (a_0, t, c_t) = a
      c_pt = { x ⊑ t.load.σN@0
             | x ∈ PtsTo(a_0, s_0) }
  in
    ( memAccess_N(s_0, a_0),
      t.load.σN@0,
      c_s ∪ c_t ∪ c_pt )

memUpdate_N(s, a, v) =
  let (s_0, c_s) = s
      (a_0, t, c_t) = a
      (v_0, v, c_v) = v
      c_pt = { t.store.σN@0 ⊑ x
             | x ∈ PtsTo(a_0, s_0) }
  in
    ( memUpdate_N(s_0, a_0, v_0),
      c_s ∪ c_t ∪ c_v ∪ c_pt
      ∪ { v ⊑ t.store.σN@0 } )
```

FIG. 11F

```
p:   push ebx    ; writes to local ext4
q:   call id
     ...
id:  ; begin procedure id()
r:   mov eax, [esp+arg0]
     ret
```

FIG. 11G

Algorithm D.2 Saturation algorithm

```
1:  procedure SATURATED(V, E)                    ▷ V is a set of vertices partitioned into V = V⁺ ∥ V⁻
2:      E' ← E                                   ▷ E is a set of edges, represented as triples (src, tgt, label)
3:      for all x ∈ V do
4:          R(x) ← ∅                             ▷ Initialize the reaching-push sets R(x)
5:      end for
6:      for all (x, y, e) ∈ E with e = push ℓ do
7:          R(y) ← R(y) ∪ {(ℓ, x)}
8:      end for
9:      repeat
10:         R_old ← R
11:         E'_old ← E'
12:         for all (x, y, e) ∈ E' with e = 1 do
13:             R(y) ← R(y) ∪ R(x)
14:         end for
15:         for all (x, y, e) ∈ E' with e = pop ℓ do
16:             for all (ℓ, z) ∈ R(x) do
17:                 E' ← E' ∪ {(z, y, 1)}
18:             end for
19:         end for
20:         for all x ∈ V⁻ do                    ▷ Lazily apply saturation rules corresponding to S-POINTER.
21:             for all (ℓ, z) ∈ R(x) with ℓ = .store do
22:                 R(x̄) ← R(x̄) ∪ {(.load, z)}
23:             end for
24:             for all (ℓ, z) ∈ R(x) with ℓ = .load do
25:                 R(x̄) ← R(x̄) ∪ {(.store, z)}
26:             end for
27:         end for
28:     until R = R_old and E' = E'_old
29:     return E'
30: end procedure
```

FIG. 12

Algorithm F.2 C type inference procedure INFERTYPES(CallGraph, $T$)
    $B \leftarrow \emptyset$     ▷ $B$ is a map from type variable to sketch.
    for all $S \in$ REVERSEPOSTORDER(CallGraph.sccs) do
        $\mathcal{C} \leftarrow \emptyset$
        for all $P \in S$ do
            $T[P] \leftarrow \emptyset$
        end for
        for all $P \in S$ do
            $\mathcal{C}_\partial \leftarrow T[P]$
            SOLVE($\mathcal{C}_\partial, B$)
            REFINEPARAMETERS($P, B$)
            $\mathcal{C} \leftarrow$ CONSTRAINTS($P, T$)
            SOLVE($\mathcal{C}, B$)
        end for
    end for
    $A \leftarrow \emptyset$
    for all $x \in B$.keys do
        $A[x] \leftarrow$ SKETCHTOAPPXCTYPE($B[x]$)
    end for
    return $A$
end procedure procedure SOLVE($\mathcal{C}, B$)
    $\mathcal{C} \leftarrow$ INFERSHAPES($\mathcal{C}, B$)
    $Q \leftarrow$ TRANSDUCER($\mathcal{C}, \overline{\Lambda}$)
    for all $\lambda \in \Lambda$ do
        for all $Xu$ such that $\lambda \stackrel{Q}{\mapsto} Xu$ do
            $\nu_{B[X]}(u) \leftarrow \nu_{B[X]}(u) \vee \lambda$
        end for
        for all $Xu$ such that $Xu \stackrel{Q}{\mapsto} \lambda$ do
            $\nu_{B[X]}(u) \leftarrow \nu_{B[X]}(u) \wedge \lambda$
        end for
    end for
end procedure

FIG. 13

Algorithm D.1 Converting a transducer from a set of pushdown system rules

```
 1: procedure ALLPATHS(V, E, x, y)        ▷ Tarjan's path algorithm. Return a finite state automaton recognizing the
                                            label sequence for all paths from x to y in the graph (V, E).
 2:     ...
 3:     return Q
 4: end procedure 5: procedure TRANSDUCER($\Delta_C$)       ▷ $\Delta_C$ is a set of pushdown system rules $\langle p^a; u \rangle \hookrightarrow \langle q^b; v \rangle$
 6:     V ← {#START, #END}
 7:     E ← ∅
 8:     for all $\langle p^a; u_1 \cdots u_n \rangle \hookrightarrow \langle q^b; v_1 \cdots v_m \rangle \in \Delta_C$ do
 9:         V ← V ∪ {$p^{a \cdot \langle u_1 \cdots u_n \rangle}, q^{b \cdot \langle v_1 \cdots v_m \rangle}$}
10:         E ← E ∪ {(#START, $p^{a \cdot \langle u_1 \cdots u_n \rangle}$, pop $p^{a \cdot \langle u_1 \cdots u_n \rangle}$)}
11:         E ← E ∪ {($q^{b \cdot \langle v_1 \cdots v_m \rangle}$, #END, push $q^{b \cdot \langle v_1 \cdots v_m \rangle}$)}
12:         for i ← 1 ... n − 1 do
13:             V ← V ∪ {$p^{a \cdot \langle u_{i+1} \cdots u_n \rangle} u_1 \cdots u_i$}
14:             E ← E ∪ {($p^{a \cdot \langle u_i \cdots u_n \rangle} u_1 \cdots u_{i-1}, p^{a \cdot \langle u_{i+1} \cdots u_n \rangle} u_1 \cdots u_i$, pop $u_i$)}
15:         end for
16:         for j ← 1 ... m − 1 do
17:             V ← V ∪ {$q^{b \cdot \langle v_{j+1} \cdots v_m \rangle} v_1 \cdots v_j$}
18:             E ← E ∪ {($q^{b \cdot \langle v_{j+1} \cdots v_m \rangle} v_1 \cdots v_j, q^{b \cdot \langle v_j \cdots v_m \rangle} v_1 \cdots v_{j-1}$, push $v_j$)}
19:         end for
20:         E ← E ∪ {($p^a u_1 \cdots u_n, q^b v_1 \cdots v_m, \underline{1}$)}
21:     end for
22:     E ← SATURATED(V, E)
23:     Q ← ALLPATHS(V, E, #START, #END)
24:     return Q
25: end procedure
```

FIG. 14

Algorithm D.3 Converting a transducer to a pushdown system procedure TYPESCHEME(Q)
        $\Delta \leftarrow$ new PDS
        $\Delta$.states $\leftarrow Q$.states
        for all $p \xrightarrow{t} q \in Q$.transitions do
            if $t = $ pop $\ell$ then
                ADDPDSRULE($\Delta, \langle p; \ell \rangle \hookrightarrow \langle q; \varepsilon \rangle$)
            else
                ADDPDSRULE($\Delta, \langle p; \varepsilon \rangle \hookrightarrow \langle q; \ell \rangle$)
            end if
        end for
        return $\Delta$
    end procedure

FIG. 15

Algorithm F.3 Procedure specialization procedure REFINEPARAMETERS($P, B$)
        for all $i \in P$.formalIns do
            $\lambda \leftarrow \top$
            for all $a \in P$.actualIns($i$) do
                $\lambda \leftarrow \lambda \sqcup B[a]$
            end for
            $B[i] \leftarrow B[i] \sqcap \lambda$
        end for
        for all $o \in P$.formalOuts do
            $\lambda \leftarrow \bot$
            for all $a \in P$.actualOuts($o$) do
                $\lambda \leftarrow \lambda \sqcap B[a]$
            end for
            $B[o] \leftarrow B[o] \sqcup \lambda$
        end for
    end procedure

FIG. 16

Algorithm E.1 Computing sketches from constraint sets

```
procedure INFERSHAPES(C_initial, B)
    C ← SUBSTITUTE(C_initial, B)
    G ← ∅           ▷ Compute constraint graph modulo ∼
    for all p.ℓ_1 ... ℓ_n ∈ C.derivedTypeVars do
        for i ← 1 ... n do
            s ← FINDEQUIVREP(p.ℓ_1 ... ℓ_{i-1}, G)
            t ← FINDEQUIVREP(p.ℓ_1 ... ℓ_i, G)
            G.edges ← G.edges ∪ (s, t, ℓ_i)
        end for
    end for
    for all x ⊑ y ∈ C do
        X ← FINDEQUIVREP(x, G)
        Y ← FINDEQUIVREP(y, G)
        UNIFY(X, Y, G)
    end for
    repeat     ▷ Apply additive constraints and update G
        C_old ← C
        for all c ∈ C_old with c = ADD(_) or SUB(_) do
            D ← APPLYADDSUB(c, G, C)
            for all δ ∈ D with δ = X ⊑ Y do
                UNIFY(X, Y, B)
            end for
        end for
    until C_old = C
    for all v ∈ C.typeVars do      ▷ Infer initial sketches
        S ← new Sketch
        L(S) ← ALLPATHSFROM(v, G)
        for all states w ∈ S do
            if ⟨w⟩ = ⊕ then
                ν_S(w) ← ⊤
            else
                ν_S(w) ← ⊥
            end if
        end for
        B[v] ← S
    end for
end procedure procedure UNIFY(X, Y, G)       ▷ Make X ∼ Y in G
    if X ≠ Y then
        MAKEEQUIV(X, Y, G)
        for all (X', ℓ) ∈ G.outEdges(X) do
            if (Y', ℓ) ∈ G.outEdges(Y) for some Y' then
                UNIFY(X', Y', G)
            end if
        end for
    end if
end procedure
```

FIG. 17

$\alpha = \text{int} \vee \text{\#SuccessZ}$
$\beta = \text{int} \wedge \text{\#FileDescriptor}$

```
xor  eax, eax
push eax          ; y := NULL
push eax          ; x := 0
call f
```

SYSTEMS AND/OR METHODS FOR TYPE INFERENCE FROM MACHINE CODE

CROSS-REFERENCES TO RELATED APPLICATIONS

This application is a continuation of application Ser. No. 15/393,463 filed Dec. 29, 2016, the entire content of which is hereby incorporated by reference in this application.

TECHNICAL FIELD

Certain example embodiments described herein relate to techniques for computer software processing. More particularly, certain example embodiments relate to techniques for reconstructing type information from machine code.

BACKGROUND AND SUMMARY OF EXAMPLE EMBODIMENTS OF THE INVENTION

For many compiled languages, source-level types are erased very early in the compilation process. As a result, further compiler passes may convert type-safe source code into type-unsafe machine code. Type-unsafe idioms in the original source and type-unsafe optimizations cause type information to be essentially non-existent in a stripped binary. The problem of recovering high-level types by performing type inference over stripped machine code is referred to as type reconstruction, and offers a useful capability in support of reverse engineering and decompilation.

Although some conventional techniques are available for determining type information from machine code, improved techniques are desired. Embodiments of the present invention provide an improved, robust and efficient technique for reconstructing type information from machine code.

According to an example embodiment, a computing system comprising at least one memory, a display and at least one processor is provided. The at least one processor is configured to execute functionality including receiving a machine code of a program, generating an intermediate representation of the machine code, generating a plurality of type constraints from the intermediate representation, generating one or more inferred types based at least upon the plurality of type constraints, converting the generated inferred types to C types, updating the intermediate representation by applying the inferred types to the intermediate representation, and outputting said inferred types, said converted C types, and/or at least a portion of the updated intermediate representation.

The converting of the generated inferred types to C types may be performed after the inferred types are generated from the intermediate representation.

The generating of one or more inferred types may include assigning a sketch to each of the inferred types. The converting to C types may include converting the sketch to one or more of said C types, where the sketch includes a record of capabilities of the inferred type to which it is assigned.

The sketch may be represented by a tree data structure, where edges of the tree represent labels corresponding to said capabilities and nodes of the tree represent type variables or type constants.

Assigned sketches may be arranged in a lattice formed by markings relating respective sketches to one or more other sketches. Type constraint may be represented in the lattice by a path from the root with a label sequence. The markings may be configured to encode higher level information including typedef name information.

The generating a plurality of type constraints from the intermediate representation includes at least one of (A) determining inputs/outputs of each procedure, (B) determining a program call graph, and (C) determining per-procedure control flow.

The computing system may further be configured to execute functionality comprising using an abstract interpreter, generating sets of type constraints from concrete TSL semantics, inserting type schemes for externally linked functions, and simplifying each constraint set.

The computing system may further be configured to execute functionality comprising assigning sketches to type variables, and specializing type schemes based on calling contexts. Further configuration may include executing functionality comprising converting inferred sketches to C types applying heuristic conversion policies.

The generating of the inferred types may be based upon subtyping. The subtyping may be implemented using type scheme specialization of subtype based constraint sets. The generating the inferred types may include interpreting recursive data structures.

The computing system may further be configured to provide for an end user to define or adjust an initial type hierarchy at run time.

The generating of a plurality of type constraints may include splitting out read and write capabilities of a pointer to have separate constraints in the plurality of type constraints. The plurality of type constraints may be generated in a bottom-up fashion over the strongly-connected components of the call graph, and where sketches are assigned to type variables while the call graph is being traversed bottom-up.

The generating of the plurality of type constraints may include creating a simplified plurality of type constraints by operations including lazily evaluates pointer derived constraints, while non-lazily evaluating other constraints.

According to another example embodiment, a method performed by at least one processor to infer types from a program is provided. The method includes receiving a machine code of the program, generating an intermediate representation of the machine code, generating a plurality of type constraints from the intermediate representation, generating one or more inferred types based at least upon the plurality of type constraints, converting the generated inferred types to C types, updating the intermediate representation by applying the inferred types to the intermediate representation, and outputting said inferred types, said converted C types, and/or at least a portion of the updated intermediate representation.

According to another example embodiment, a non-transitory computer-readable storage medium is provided. Instructions stored on the storage medium, when executed by a computer, may cause the computer to perform operations including receiving a machine code of a program, generating an intermediate representation of the machine code, generating a plurality of type constraints from the intermediate representation, generating one or more inferred types based at least upon the plurality of type constraints, converting the generated inferred types to C types, updating the intermediate representation by applying the inferred types to the intermediate representation, and outputting said inferred types, said converted C types, and/or at least a portion of the updated intermediate representation.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 illustrates example labels (i.e. field labels) according to some embodiments;

FIG. 5 illustrates deduction rules, type variables and labels according to some embodiments;

FIG. 6 illustrates example C code, disassembled version of the example C code, inferred type scheme and a reconstructed C type, according to some embodiments;

FIG. 7 illustrates example generated constraints based on the code of FIG. 6, in accordance with some embodiments;

FIG. 10 illustrates pseudocode for constraint generation, according to some embodiments;

FIGS. 11A-G illustrate interpretations by an abstract interpreter, according to some embodiments.

FIG. 12 illustrates pseudocode for a saturation technique, according to some embodiments;

FIG. 13 illustrates pseudocode for inferring types according to some embodiments;

FIG. 14 illustrates pseudocode for converting a transducer from a set of pushdown system rules, according to some embodiments;

FIG. 15 illustrates pseudocode for converting a transducer to a pushdown system, according to some embodiments;

FIG. 16 illustrates pseudocode for procedure specialization, according to some embodiments;

FIG. 17 illustrates pseudocode for computing sketches from constraint sets, according to some embodiments;

DETAILED DESCRIPTION OF EXAMPLE EMBODIMENTS OF THE INVENTION

Figure 1:
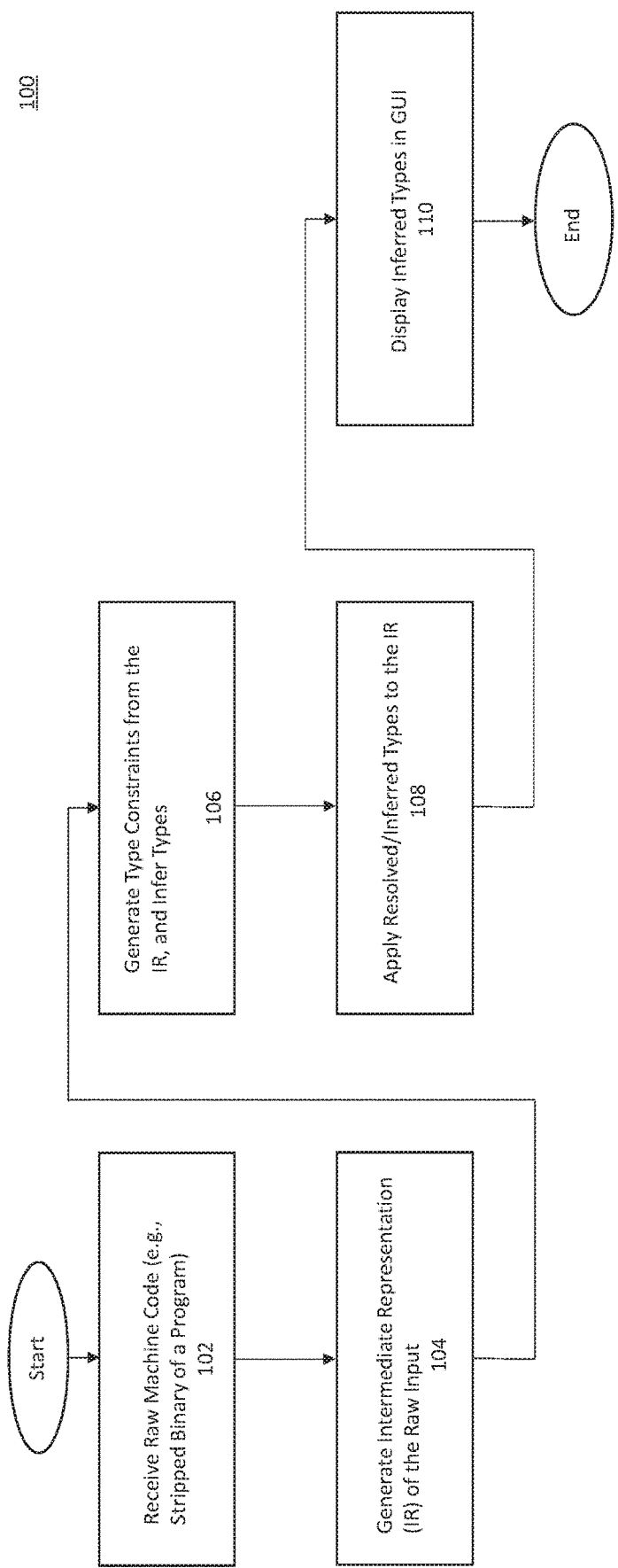
FIG. 1 is a flow chart illustrating the overall process for type inference according to one or more embodiments.

As noted above, machine code, especially stripped binaries of programs, may have all or almost all the type information of variables, constants and other idioms (i.e., phrases used in source code) removed. Such removal is often done for reasons such as optimizing the code size, reducing memory footprint, etc.

However, many applications may require the reconstruction of type information for such stripped binaries. For example, reverse engineering the source code from a binary would in many cases require such type reconstruction. The reverse engineering may be for reasons such as, bug-fixing a program for which the original source code is no longer available, for determining the operation and source of a malware, examining the security of a binary, and the like.

Some example embodiments provide a novel static type inference algorithm for machine code that supports recursive types, polymorphism, and subtyping. The example embodiments have yielded more accurate inferred types than existing conventional type reconstruction techniques, while also enabling new capabilities such as, but not limited to, reconstruction of pointer const annotations with very high (e.g., 98%) recall. Some example embodiments can operate on weaker program representations than the current state of the art conventional techniques, thereby removing the need for high-quality points-to information that may be impractical to obtain from a stripped binary, or too costly in terms of the required processing, to compute.

Some example embodiments provide a machine-code type inference tool that can find regular types using pushdown systems. The tool includes several features targeted at improved types for reverse engineering, decompilation, and high-level program analyses. These features include: inference of most-general type schemes; inference of recursive structure types; sound analysis of pointer subtyping; tracking of customizable, high-level information such as purposes (e.g., see tags #FileHandle and #SuccessZ in FIG. 6) and typedef names; inference of type qualifiers such as const; ability to operate without high-quality points-to data; and, more accurate recovery of source-level types.

Like some conventional techniques, certain example embodiments provide a principled static type inference algorithm that can be applied to stripped binaries. However, unlike conventional techniques, certain example embodiments follow the principled type inference phase by a second phase that uses heuristics to adapt the inferred types to human-readable C types before output or display. By factoring the type inference process into two phases, the example embodiments sequester potentially unsound heuristics and quirks of the C type systems from the sound core of the type inference engine. This capability for sequestering adds a degree of freedom to the design space so that a relatively complex type system can be leveraged during type analysis, while still emitting familiar C types for the benefit of a process such as, for example, a more user-friendly reverse engineering process. In some embodiments no converting of inferred types to C types occur, until the inferring of all type information for an intermediate representation has completed.

There are many challenges to performing type inference on binaries of programs and on many common machine code idioms that lead to sophisticated demands on the feature set of a type system. These challenges include, many optimizations being performed on the code after type erasure; polymorphic functions; recursive types; offset and reinterpreted pointers; disassembly failures; cross-casting and bit twiddling, incomplete points-to information, and adhoc subtyping. The type system of certain example embodiments is designed to correctly type machine code idioms in the presence of one or more of these challenges. This design has resulted in certain example embodiments having a rich type system including features such as recursively constrained type schemes that have not previously been applied to machine code type inference.

When optimizations have been performed on the code after type erasure, since type erasure typically occurs early in the compilation process, many compiler optimizations may take well-typed machine code and produce functionally equivalent but ill-typed results. Three common optimization techniques require particular care: the re-use of stack slots, the use of a variable as a syntactic constant, and early returns along error paths.

The optimizations concerning the re-use of stack slots takes advantage of the aspect that, if a function uses two variables of the same size in disjoint scopes, there is no need to allocate two separate stack slots for those variables. Instead, the optimizer may reuse a stack slot from a variable that has dropped out of scope. This optimization can be performed even if the new variable has a different type, and may even apply to the stack slots used to store formal-in parameters. For example, when a function's argument is no longer needed, the optimizer can overwrite the argument with a local variable of an incompatible type. More generally, in order to correctly address binaries in which re-use of stack variables has been performed, the type reconstruction in certain example embodiments does not assume that the map from program variables to physical locations is one-to-one. Even the weaker assumption that the program variables inhabiting a single physical location at different times will all belong to a single type may not be correct when used in relation to some binaries, and is not an assumption made in certain example embodiments.

As noted above, another optimization that may have been performed after type erasure occurs with respect to semi-syntactic constants. Consider a function with signature void $f$(int x, char* y) which is invoked as $f$(0, NULL). This may be compiled to x86 machine code similar to FIG. 20. This represents a code-size optimization, because push eax ("eax" represents the accumulator in the example x86 machine code) can be encoded in one byte instead of the five bytes needed to push an immediate value (e.g., 0). In situations such as this, the example embodiments operate without unifying the type variables for x and y; here, eax is being used more like a syntactic constant than a dynamic value that should be typed.

Another optimization concerns the fortuitous reuse of values. A related situation is illustrated in the common control flow pattern represented by the snippet of C and the corresponding machine code in FIG. 6. Note that on procedure exit, the return value in eax may have come from either the return value of S2T or from the return value of get_S (if NULL). Certain example embodiments detect this situation so that a false relationship is not caused between the incompatible return types of get_T and get_S.

In certain example embodiments, the above described challenges posed by optimizations performed after type erasure are addressed through a combination of type system features (e.g., subtyping instead of unification) and program analyses (e.g., reaching definitions for stack variables and trace partitioning). Whereas, in unification a substitution is found that makes two given terms equal, in subtyping substitutions involve supertype-subtype relationship between the terms. A reaching definition for an instruction is an earlier instruction whose target variable can reach (be assigned to) the given one without an intervening assignment. An example trace partitioning scheme that may be adapted for one or more example embodiments is described for example in L. Mauborgne and X. Rival. "*Trace partitioning in abstract interpretation based static analyzers*", in Programming Languages and Systems, pages 5-20, Springer, 2005.

With respect to the challenge to type reconstruction posed by polymorphic functions, the inventors were surprised to discover that, although not directly supported by the C type system, most programs define or make use of functions that are effectively polymorphic. A well known example among these may be malloc for which the return value is expected to be immediately cast to some other type T*. Thus, each call to malloc may be thought of as returning some pointer of a different type. The type of malloc is effectively not size_t→void*, but rather $\forall \tau.\text{size\_t} \rightarrow \tau^*$.

The problem of a polymorphic malloc can be mitigated by treating each call-site p as a call to a distinct function malloc$_p$, each of which may have a distinct return type $T_p^*$. Unfortunately it may not be sufficient to treat a handful of special functions like malloc this way: binaries that utilize user-defined allocators and wrappers to malloc are commonly in use. Type reconstruction tools according to certain example embodiments are capable of accurately identifying and duplicating all of these functions for each call-site.

A similar problem like in malloc exists for functions such as free, which is polymorphic in its lone parameter. Even more complex are functions like memcpy, which is polymorphic in its first two parameters and its return type, though the three types are not independent of each other. Furthermore, the polymorphic type signatures "malloc $\forall \tau.\text{size\_t} \rightarrow \tau^*$", "free: $\forall \tau.\tau^* \rightarrow \text{void}$", and "memcpy: $\forall \alpha, \beta. (\beta \sqsubseteq \alpha) \Rightarrow (\alpha^* \times \beta^* \times \text{size\_t}) \rightarrow \alpha^*$", used in some embodiments, are all more informative to the reverse engineer than the standard C signatures. For example, without such informative signatures, the reverse engineering technician may not know that the void* returned by malloc is not meant to be an opaque handle, but rather should be cast to some other pointer type.

In compiled C++ binaries, polymorphic functions are even more common. For example, a class member function must potentially accept both base_t* and derived_t* as types for this.

Example embodiments provide for polymorphic functions as a common feature of machine code, and include the capability to infer polymorphic types of nontrivial complexity. Foster, Johnson, Kodumal, and Aiken, "*Flow insensitive type qualifiers*", ACM Transactions on Programming Languages and Systems (TOPLAS), 28(6):1035-1087, 2006, describes polymorphic types and notes that using bounded polymorphic type schemes for libc functions increased the precision of type-qualifier inference, at the level of source code.

Another challenge for type reconstruction concerns recursive types. The relevance of recursive types for decompilation was recently discussed by Schwartz et al. E. J. Schwartz, J. Lee, M. Woo, and D. Brumley, "*Native x86 decompilation using semantics-preserving structural analysis and iterative control-flow structuring*", in Proceedings of the USENIX Security Symposium, page 16, 2013, where lack of a recursive type system for machine code was cited as an important source of imprecision. Since recursive data structures are relatively common, it is desirable, as in certain example embodiments, that a type inference scheme for machine code be able to represent and infer recursive types natively.

Offset and reinterpreted pointers pose another challenge to type reconstruction. Unlike in source code, there is no syntactic distinction in machine code between a pointer-to-struct and a pointer-to-first-member-of-struct. For example, if X has type struct {char*, FILE*, size_t}* on a 32-bit platform, then it should be possible to infer that X+4 can be safely passed to fclose; conversely, if X+4 is passed to fclose the system may need to infer that X points to a structure that, at offset 4, contains a FILE*. This affects the typing of local structures, as well: a structure on the stack may be manipulated using a pointer to its starting address or by manipulating the members directly, e.g., through the frame pointer.

These idioms, along with casts from derived* to base*, fall under the general class of physical or non-structural subtyping. Physical subtyping is described in A. Slowinska, T. Stancescu, and H. Bos. Howard, "*A dynamic excavator for reverse engineering data structures*", in Proceedings of the 18th Annual Network and Distributed System Security Symposium (NDSS '11), 2011. Non-structural subtyping is described in J. Palsberg, M. Wand, and P. O'Keefe, "*Type inference with non-structural subtyping*", Formal Aspects of Computing, 9(1): 49-67, 1997.

In certain example embodiments, these forms of subtyping are implemented using type scheme specialization. Some embodiments use parameter-offset analysis to obtain additional hints about the extent of local variables. Type scheme specialization in embodiments is discussed below. An example parameter-offset analysis that can be implemented in embodiments is described in D. Gopan, E. Driscoll, D. Nguyen, D. Naydich, A. Loginov, and D. Melski, "*Data-delineation in software binaries and its application to buffer-overrun discovery*", in Proceedings of the 37th International Conference on Software Engineering, Volume 1, ICSE '15, pages 145-155, Piscataway, N.J., USA, 2015. IEEE Press. ISBN 978-1-4799-1934-5.

Yet another challenge for type reconstruction are disassembly failures. The problem of producing correct disassembly for stripped binaries is considered to be equivalent to the Halting Problem. As a result, example embodiments do not operate under the assumption that the reconstructed program representation is completely correct. Example embodiments safeguard against incorrect disassembly or analysis results from one part of the binary influencing the correct type results gathered for the rest of the binary.

Type systems that model value assignments as type unifications are vulnerable to over-unification issues caused by faulty intermediate representations (IR). Since unification is non-local, bad constraints in one part of the binary can degrade all type results. Another instance of this problem arises from the use of register parameters. Although the x86 cdecl calling convention uses the stack for parameter passing, most optimized binaries include many functions that pass parameters in registers for speed. Often, these functions do not conform to any standard calling convention. Although generally only true register parameters are reported, the occasional false positive may occur.

Type reconstruction methods that are based on unification are generally sensitive to precision loss due to false positive register parameters. A common case is the "push ecx" idiom that reserves space for a single local variable in the stack frame of a function $f$. If ecx is incorrectly viewed as a register parameter of $f$ in a unification-based scheme, whatever type variables are bound to ecx at each call-site to $f$ will be falsely unified. These over-unifications may be a persistent and hard-to-diagnose source of imprecision. Example embodiments' subtype-based constraint sets avoid the need for adhoc prophylactics against over-unification, thus eliminating a disproportionately large and unprincipled component of type analysis caused by conventional techniques when addressing over-unification.

Cross-casting and bit-twiddling is yet another challenge for type reconstruction. Many type-unsafe idioms are in common use even at the level of source code. Many of these idioms operate by directly manipulating the bit representation of a value, either to encode additional information or to perform computations that are not possible using the type's usual interface. Some common examples include: hashing values by treating them as untyped bit blocks; stealing unused bits of a pointer for tag information, such as whether a thunk has been evaluated; reducing the storage requirements of a doubly-linked list by XOR-combining the next and prev pointers; and directly manipulating the bit representation of another type.

Because of these type-unsafe idioms, it is important that a type inference scheme continues to produce useful results even in the presence of apparently contradictory constraints. This situation is handled in example embodiments in any of three ways: separating the phases of constraint entailment, solving, and consistency checking; modeling types with sketches, which carry more information than C types; and using unions to combine types with otherwise incompatible capabilities (e.g., $\tau$ is both int-like and pointer-like).

Incomplete points-to information also poses a challenge to type reconstruction. Degradation of points-to accuracy on large programs has been identified as a frequent source of type-precision loss in many other systems. Example embodiments provide high-quality types even in the presence of relatively weak points-to information. Precision can be further improved by increasing points-to knowledge via machine-code analyses such as value-set analysis (VSA) in some example embodiments, but good results are already attained with no points-to analysis beyond the simpler problem of tracking the stack pointer in other example embodiments.

Another challenge to type reconstruction is presented in adhoc subtyping. Programs may define an adhoc type hierarchy via typedefs. This idiom appears in the Windows™ API, where a variety of handle types are all defined as typedefs of void*. Some of the handle types are to be used as subtypes of other handles; for example, a GDI handle (e.g., HGDI) is a generic handle used to represent any one of the more specific HBRUSH, HPEN, etc. In other cases, a typedef may indicate a supertype, as in LPARAM or DWORD; although these are typedefs of int, they have the intended semantics of a generic 32-bit type, which in different contexts may be used as a pointer, an integer, a flag set, and so on.

Figure 2:
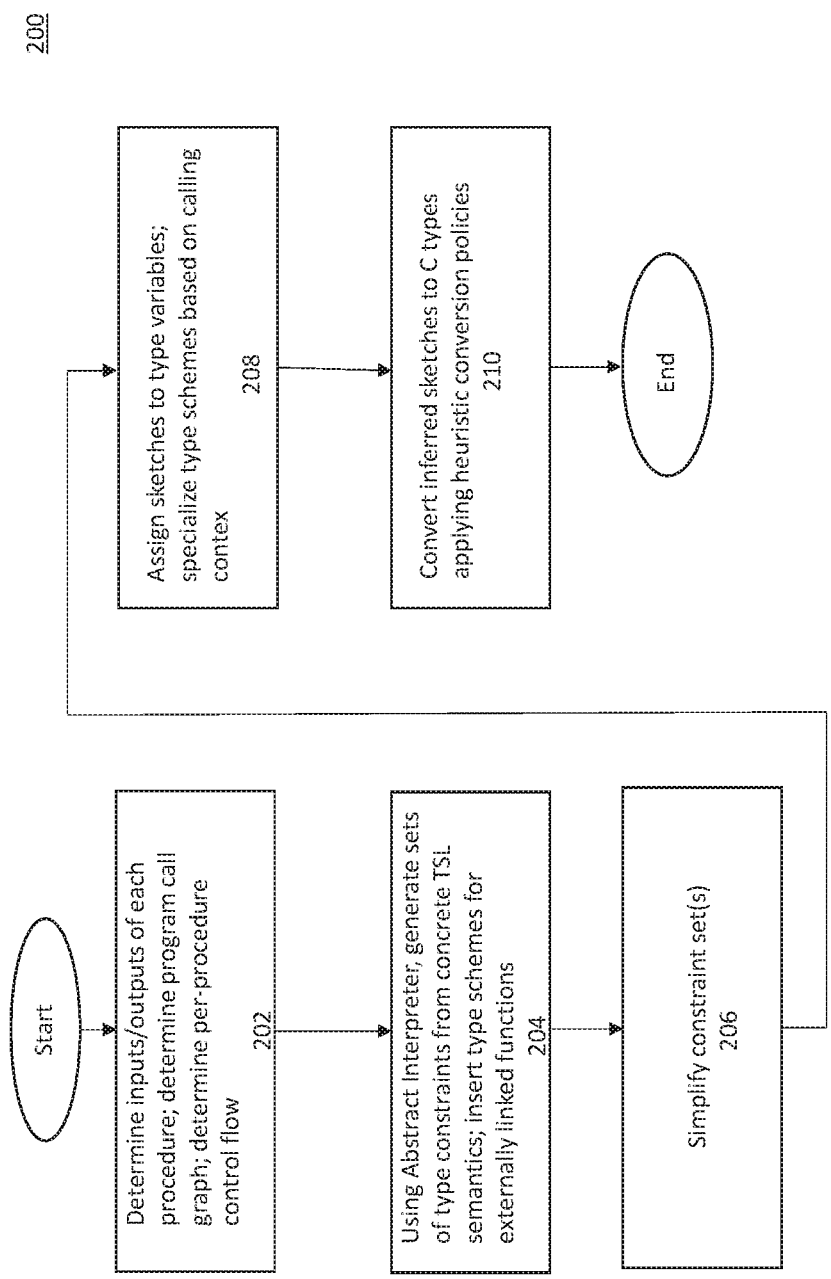
FIG. 2 illustrates further details of type constraint generation for type inference, according to some embodiments.
Figure 3:
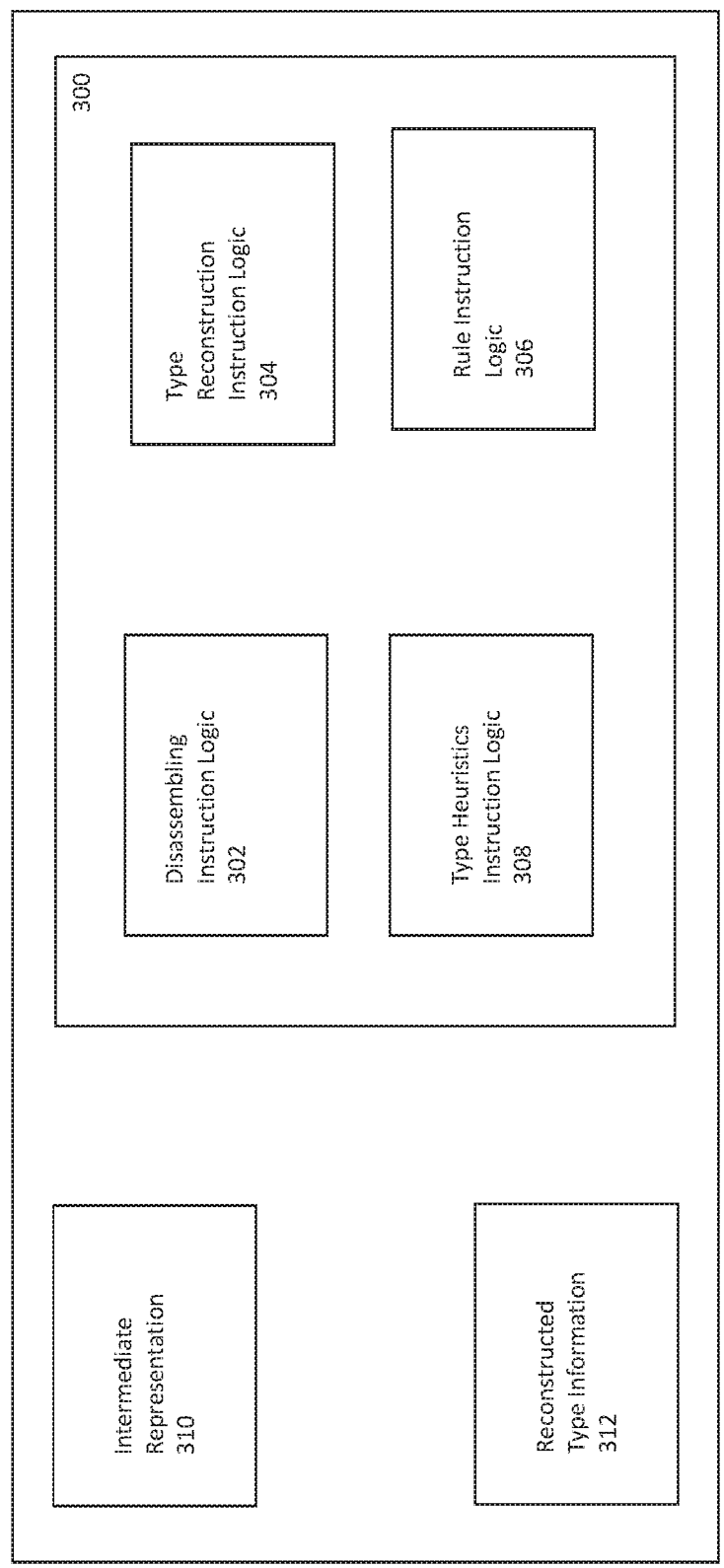
FIG. 3 illustrates a block diagram of instruction logic for the system of FIG. 1, according to some embodiments.

To accurately track adhoc type hierarchies requires a type system based upon subtyping rather than on unification. The ability for the end user to define or adjust the initial type hierarchy at run time is useful. Example embodiments provide this feature by parameterizing the main type representation by an uninterpreted lattice Λ. FIG. 1 is a flowchart of the overall process of type inferring according to one or more example embodiments, and FIG. 2 is a flowchart for process for determining the inferred types. FIG. 3 illustrates a blockdiagram showing the instruction logic components. FIGS. 1-3 are described later in this document, after certain aspects of the technique of type inference is described.

The type system of certain example embodiments is based upon the inference of recursively constrained type schemes. The recursively constrained type schemes abstract over a set of types subject to a type constraint set C. The solutions to type constraint sets are modeled by sketches. A sketch is associated to a value and consists of a record of capabilities which that value holds, such as whether it can be stored to, called, or accessed at a certain offset. Sketches also include markings drawn from a customizable lattice (Λ, $\vee$, $\wedge$, <), used to propagate high-level information such as typedef names and domain-specific purposes during type inference.

The language of type constraints used by example embodiments may be weak enough that, for any type constraint set C, satisfiability of C can be reduced (e.g., in cubic time) to checking a set of scalar constraints $k_1 <: k_2$, where $k_1$ are constants belonging to the lattice Λ. Due to the reduction of constraint satisfiability to scalar constraint checking, expensive satisfiability checks during type inference can be omitted or reduced in example embodiments. Instead, such checks may be delayed until the final stage of the type inference process when determined types are converted to C types for display to the user, providing an efficient place to instantiate union types that resolve any remaining inconsistencies. Since compiler optimizations and type-unsafe idioms in the original source frequently lead to program fragments with unsatisfiable type constraints (e.g., due to disassembly failures, cross-casting and bit twiddling), this capability is particularly desirable because of its capability of increasing the overall efficiency and speed of operation in example embodiments.

Description of the syntax of the constraint type system used in certain example embodiments may be assisted by defining some terminology. Throughout this description, a set V of type variables, an alphabet $\Sigma$ of labels (e.g., also referred to as field labels), and a function (•): $\Sigma \to \{\oplus, \ominus\}$ denoting the variance of each label is considered. V may optionally also include any type constants, such as, for example, named types (e.g., size_t, FILE, HANDLE) or semantics tags (e.g., "error code", "thread id", "username", "filename", "file mode" etc.). The set $\Sigma$ of labels is not required to be finite, and some embodiments may accommodate an infinite number of labels and other embodiments may handle only a finite number of labels. For simplicity, and without limitation, the description on this document is focused primarily on those labels shown in FIG. 4.

Within V, as noted above, there may be a distinguished set of type constants. These type constants are symbolic representations κ of elements κ belonging to some lattice, but may otherwise be uninterpreted. In certain example embodiments, the type constants may be type names or semantic tags.

A derived type variable is an expression of the form αw with α∈V and w ∈$\Sigma$*. The variance of a label R encodes the subtype relationship between α.l and β.l when α is a subtype of β, formalized in rules S-FIELD$_\oplus$ and S-FIELD$_\ominus$ shown in FIG. 5. A type constraint is an expression of the form VAR X ("existence of the derived type variable X") or X $\sqsubseteq$ Y ("X is a subtype of Y"), where X and Y are derived type variables. A type constraint set over V is a finite collection C of type constraints, where the type variables in each type constraint are either type constants or members of V. The labels used to form derived type variables in example embodiments represent capabilities of that type. For example, the constraint VAR α.load means α is a readable pointer, and the derived type variable α.load represents the type of the memory region obtained by loading from α. The constraint generation may generate a constraint set per procedure. C entails c, denoted C⊢c, if c can be derived from the constraints in C using the deduction rules shown, for example, in FIG. 5. Projections may be allowed: given a constraint set C with free variable τ, the projection ∃τ.C binds τ as an "internal" variable in the constraint set. See τ in FIG. 6 for an example. A description of constraint projection is provided in Z. Su, A. Aiken, J. Niehren, T. Priesnitz, and R. Treinen, "*The first-order theory of subtyping constraints*", in Proceedings of the 29th ACM SIGPLAN-SIGACT Symposium on Principles of Programming Languages, POPL '02, pages 203-216. ACM, 2002.

The translation of operations in a program binary, in certain example embodiments, to type constraints and thereafter to inferred types is described in the following paragraphs using C syntax for clarity. Clearly embodiments are not limited to presenting type information in C syntax. The full conversion from disassembly to type constraints is described in the reference Noonan, Loginov and Cok, "Polymorphic type inference for machine code" ACM SIGPLAN Notices-PLDI '16, Volume 51 Issue 6, June 2016, pages 27-41, ACM New York, N.Y., USA (herein referred to as "Noonan") in Appendix A. Noonan is hereby incorporated by reference in its entirety.

Example constraint generation for value copy operations, load and store operations, and function calls are described below. For a value copy operation, when a value is moved between program variables in an assignment like x:=y, example embodiments may make the conservative assumption that the type of x may be upcast to a supertype of y. A type constraint of the form Y $\sqsubseteq$ X may be generated.

For loads and store operations, if p is a pointer to a 32-bit type, and a value is loaded into x by the assignment x:=*p, then an example embodiment may generate a constraint of the form P.load.σ32@0 $\sqsubseteq$ X. Similarly, a store *q:=y results in the type constraint Y $\sqsubseteq$ Q.store.σ32@0. In some of the described pointer-based examples in this description the final ".σ@k" access after a .load or .store to is omitted simplify the presentation.

For function calls, if the function $f$ is invoked by y:=$f$(x), example embodiments generate the type constraints X $\sqsubseteq$ F.in and F.out $\sqsubseteq$ Y, reflecting the flow of actuals to and from formals. Note that if A.in=X and A.out=Y are defined, then the two constraints are equivalent to F $\sqsubseteq$ A by the rules of FIG. 5. This encodes that the called function's type must be at least as specific as the type used at the call-site.

One of the primary goals of the type inference engine in example embodiments is to associate to each procedure a type scheme. A type scheme can be represented by an expression of the form $\forall \alpha.C \Rightarrow \alpha_1$ where $\forall \alpha = \forall \alpha_1 \ldots \forall \alpha_n$ is quantification over a set of type variables, and C is a constraint set over $\{\alpha_i\}_{i=1 \ldots n}$. Type schemes provide a way of encoding the pre- and post-conditions that a function places on the types in its calling context. Without the constraint sets, the system would only be able to represent conditions of the form "the input must be a subtype of X" and "the output must be a supertype of Y". The type constraint set C can be used to encode more interesting type relations between inputs and outputs, as in the case of memcpy discussed above in relation to challenges posed for type reconstructions by polymorphic functions. For example, a function that returns the second 4-byte element from a struct* may have the type scheme $\forall \tau$. (τ.in.load.σ32@4 $\sqsubseteq$ τ.out)⇒τ.

Deduction rules for one or more example embodiments are shown in FIG. 5. Most of the rules are self-evident under the interpretation above regarding constraints, but it may be helpful to provide some additional motivation regarding some others. In FIG. 5, α, β, γ represent derived type variables, and l represents a label in $\Sigma$.

S-FIELD$_\oplus$ and S-FIELD$_\ominus$ are rules to ensure that labels act as co- or contravariant type operators, generating subtype relations between derived type variables from subtype relations between the original variables. T-INHERITL specifies that a subtype should have all capabilities of its supertype, and T-INHERITR moves capabilities in the other direction. Taken together, T-INHERITL and T-INHERITR require that two types in a subtype relation must have exactly the same set of capabilities. This is a form of structural typing, ensuring that comparable types have the same shape.

Structural typing appears to be at odds with the need to cast more capable objects to less capable ones, as described above in relation to the offset and reinterpreted points. Indeed, T-INHERITR eliminates the possibility of forgetting capabilities during value assignments. But the systems according the embodiments maintain this capability at procedure invocations by the use of polymorphic type schemes. An explanation of how type-scheme instantiation enables forgetting fields of an object appears below in relation to non-structural subtyping and T-INHERITR, with more details in Noonan which is incorporated by reference.

These rules ensure that example embodiments can be used to perform "iterative variable recovery". The lack of iterative variable recovery has been cited as a common cause of incorrect decompilation in conventional type inference systems.

The S-POINTER rule is a consistency condition ensuring that the type that can be loaded from a pointer is a supertype of the type that can be stored to a pointer. Without this rule, pointers would provide a channel for subverting the type system.

The deduction rules such as that in FIG. 5 can each be reduced mathematically to a normal form. An encoding of the normal forms as transition sequences in a modified pushdown system may be used in example embodiments to provide a compact representation of the entailment closure $C=\{c|C\vdash c\}$. The pushdown system (described below) modeling C is queried and manipulated in example embodiments to provide most of the interesting type inference functionality.

Figures 8, 9:
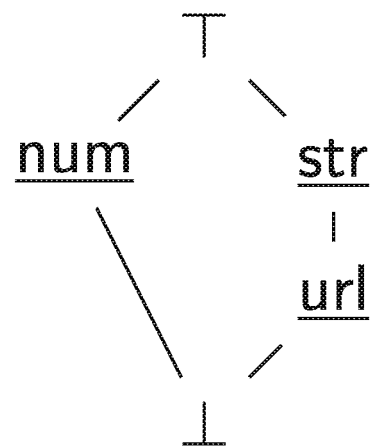
FIG. 8 illustrates an example lattice according to some embodiments.
FIG. 9 illustrates example code snippets.

With respect to modeling parameters soundly in the presence of subtyping, with respect to the example code shown in FIG. 9, since the type variables P and Q associated to p, q can be seen to be pointers, one can begin by setting $P=Ptr(\alpha)$, $Q=Ptr(\beta)$. The first program on the left side of FIG. 9 may generate the constraint set $C_1=\{Ptr(\beta)\sqsubseteq Ptr(\alpha), X\sqsubseteq \alpha, \beta\sqsubseteq Y\}$, while the second (program on the right side of FIG. 9) generates $C_2=\{Ptr(\beta)\sqsubseteq Ptr(\alpha), X\sqsubseteq \beta, \alpha\sqsubseteq Y\}$. Since each program has the effect of copying the value in x to y, both constraint sets should satisfy $C_i\vdash X\sqsubseteq Y$. To do this, the pointer subtype constraint must entail some constraint on $\alpha$ and $\beta$.

The root cause of the difficulty in selecting a constraint on $\alpha$ and $\beta$ is due to conflating two capabilities that (most) pointers have: the ability to be written through, and the ability to be read through. In certain example embodiments, these two capabilities are modeled using different field labels .store and .load. The .store label is contravariant, while the .load label is covariant. By splitting out the read- and write-capabilities of a pointer, the example embodiments achieve a sound account of pointer sub-typing that does not degenerate to type equality. Note the importance of the consistency condition S-POINTER: this rule ensures that writing to a pointer and reading a result out cannot subvert the type system.

It was noted in relation to deduction rules above that the rule T-INHERITR leads to a system with a form of structural typing: any two types in a subtype relation must have the same capabilities. Superficially, this seems problematic for modeling typecasts that forget about fields, such as a cast from derived* to base* when derived* has additional fields. The missing piece that allows example embodiments to effectively "forget" capabilities is instantiation of callee type schemes at a call-site. To demonstrate how polymorphism enables "forgetfulness", consider the example type scheme $\forall F. (\exists \tau.C)\Rightarrow F$ from FIG. 6. The function close_last can be invoked by providing any actual-in type a such that $\alpha \sqsubseteq F.in_{stack0}$; in particular, $\alpha$ can have more fields than those required by C. Select a more capable type for $\tau$ in C. In effect, the example embodiments use specialization of polymorphic types to model non-structural subtyping idioms, while subtyping is used only to model structural subtyping idioms. This restricts the example embodiments' introduction of non-structural subtypes to points where a type scheme is instantiated, such as at a call-site.

The simple type system defined by the deduction rules of FIG. 5 defines the syntax of valid derivations in the type system of certain example embodiments. The constraint solver of example embodiments is designed to find a simple representation for all conclusions that can be derived from a set of type constraints. Yet, in example embodiments, there is no notion of what a type is inherent to the deduction rules of FIG. 5.

The inventors found that introducing C-like types at the level of constraints or types resulted in too much loss of precision when working with the challenging examples described in relation to the challenges faced when performing type reconstruction. Consequently the inventors developed the notion of a sketch, a certain kind of regular tree labeled with elements of an auxiliary lattice A. Sketches are related to the recursive types studied in R. M. Amadio and L. Cardelli, "*Subtyping recursive types*". ACM Transactions on Programming Languages and Systems (TOPLAS)", 15(4):575-631, 1993, and D. Kozen, J. Palsberg, and M. I. Schwartzbach, "*Efficient recursive subtyping*", Mathematical Structures in Computer Science, 5(01):113-125, 1995, but do not depend on a priori knowledge of the ranked alphabet of type constructors.

A sketch is a (possibly infinite) tree T with edges labeled by elements of $\Sigma$ and nodes marked with elements of a lattice $\Lambda$, such that T only has finitely many subtrees up to labeled isomorphism. By collapsing isomorphic subtrees, sketches can be represented as deterministic finite state automata with each state labeled by an element of $\Lambda$. The set of sketches admits a lattice structure, with operations described in already incorporated Noonan at Appendix E.

The lattice of sketches serve as the model in which type constraints are interpreted in example embodiments. The interpretation of the constraint VAR $\alpha$. u is "the sketch $S_\alpha$ admits a path from the root with label sequence u", and $\alpha.u \sqsubseteq \beta.v$ is interpreted as "the sketch obtained from $S_\alpha$ a by traversing the label sequence u is a subsketch (in the lattice order) of the sketch obtained from $S_\beta$ by traversing the sequence v."

The main utility of sketches is that they are nearly a free tree model (see e.g., F. Pottier and D. Re'my, "*The essence of ML type inference*", in B. C. Pierce, editor, Advanced Topics in Types and Programming Languages, chapter 10, MIT Press, 2005) of the constraint language. Any constraint set C is satisfiable over the lattice of sketches, as long as C cannot prove an impossible subtype relation in the auxiliary lattice $\Lambda$. In particular, the fragment of C that does not reference constants in $\Lambda$ can always be solved. Stated operationally, the tree structure of sketches that potentially solve C can always be recovered. In this context "solved" means that sketches can always be directly constructed that conform to any given constraints, if the labels on the nodes of the sketches are disregarded. This observation is formalized in Noonan.

In example embodiments, a large auxiliary lattice $\Lambda$ containing hundreds of elements that includes a collection of standard C type names, common typedefs for popular APIs, and user-specified semantic classes such as #FileHandle in FIG. 6 may be used. This lattice helps model adhoc subtyping and preserve high-level semantic type names, as discussed above in relation to challenges posed by adhoc subtyping. An example lattice is shown in FIG. 8—although only a lattice of some sematic classes.

Certain example embodiments are built on GrammaTech's machine-code analysis tool CodeSurfer® for Binaries. CodeSurfer® performs common program analyses on binaries for multiple CPU architectures, including x86, x86-64, and ARM. CodeSurfer® is used to recover a high-level IR from the raw machine code; type constraints are generated directly from this IR, and resolved types are applied back to the IR and become visible to the GUI and later analysis phases.

CodeSurfer® achieves platform independence through TSL (see J. Lim and T. Reps, "*TSL: A system for generating abstract interpreters and its application to machine-code analysis*", ACM Transactions on Programming Languages and Systems (TOPLAS), 35(1):4, 2013), a language for defining a processor's concrete semantics in terms of concrete numeric types and mapping types that model register and memory banks. Interpreters for a given abstract domain are automatically created from the concrete semantics simply by specifying the abstract domain A and an interpretation of the concrete numeric and mapping types. Certain example embodiments uses CodeSurfer's® recovered IR to determine the number and location of inputs and outputs to each procedure, as well as the program's call graph and per-procedure control-flow graphs. An abstract interpreter then generates sets of type constraints from the concrete TSL instruction semantics. A detailed account of the abstract semantics for constraint generation appears in Appendix A of Noonan which is incorporated by reference.

After the initial IR is recovered, type inference proceeds in two stages: first, type constraint sets are generated in a bottom-up fashion over the strongly-connected components of the call graph. Once type schemes are available, the call graph is traversed bottom-up, assigning sketches to type variables. During this stage, type schemes are specialized based on the calling contexts of each function. The final phase of type resolution converts the inferred sketches to C types for presentation to the user. Since C types and sketches are not directly comparable, this resolution phase necessarily involves the application of heuristic conversion policies.

Heuristic rules may be used in determining the displayable types corresponding to each internal type. Restricting the heuristic policies to a single post-inference phase, as enabled the use of sketches by example embodiments, provides the example embodiments with substantial flexibility to generate high-quality, human-readable C types (e.g., C types) while maintaining soundness and generality during type reconstruction.

A simplification algorithm is at the core of the constraint solver in example embodiments. The complete algorithm can be found in Noonan at Appendix D. A type scheme is inferred using the simplification algorithm. The goal of the simplification algorithm is to take an inferred type scheme $\forall \alpha.C \Rightarrow \tau$ for a procedure and create a smaller constraint set C' such that any constraint on $\tau$ implied by C is also implied by C'. Let C denote the constraint set generated by abstract interpretation of the procedure being analyzed, and let a be the set of free type variables in C. $\forall \alpha. C \Rightarrow \tau$ can be used as the constraint set in the procedure's type scheme, since the input and output types used in a valid invocation of $f$ are tautologically those that satisfy C. Yet as a practical matter the constraint set may not be used directly, since this would result in constraint sets with many useless free variables and a high growth rate over nested procedures.

Instead, example embodiments seek to generate a simplified constraint set C' such that if c is an "interesting" constraint and C⊢c then C'⊢c as well. For a type variable $\tau$, a constraint is called interesting if it has one of the following forms: a capability constraint of the form VAR $\tau$.u; a recursive subtype constraint of the form $\tau.u \sqsubseteq \tau.v$; and a subtype constraint of the form $\tau.u \sqsubseteq \kappa$ or $\kappa \sqsubseteq \tau.u$, where $\kappa$ is a type constant. A constraint set C' may be called a simplification of C if C'⊢c for every interesting constraint c such that C⊢c. Since both C and C' entail the same set of constraints on $\tau$, it is valid to replace C with C' in any valid type scheme for $\tau$. Example embodiments may use one or more the heuristics proposed in Fhndrich and Aiken, "*Making set-constraint program analyses scale*", in Workshop on Set Constraints, 1996, during constraint solving. Two example heuristics are elimination of intermediate variables (X<Y<Z becoming X<Z, with Y eliminated) and collapsing of cycles (replacing X<Y, Y<Z, Z<X with just X, eliminating Y and Z).

The constraint-simplification algorithm works on a constraint set C by building a pushdown system $P_C$ whose transition sequences represent valid derivations of subtyping judgments. An unconstrained pushdown system is a triple P=(V, $\Sigma$, $\Delta$) where V is the set of control locations, $\Sigma$ is the set of stack symbols, and $\Delta \subseteq (V \times \Sigma^*)^2$ is a (possibly infinite) set of rewrite rules. A rewrite rule can be denoted by (X; u)c→(Y; v) where X, Y $\in$V and u, v$\in\Sigma$*. The set of configurations may be defined to be V×$\Sigma$*. In a configuration (p, w), p is called the control state and w the stack state. Using a pushdown system provides a finite and efficient model for working with the infinite set of constraints entailed by (or implied by) C. Efficient algorithms exist for working with pushdown systems, which (with modifications as described) allow efficient manipulation of these infinite constraint sets.

Example embodiments require neither the set of stack symbols nor the set of rewrite rules to be finite. This freedom is needed to model the derivation S-POINTER of FIG. 5, which corresponds to an infinite set of rewrite rules.

An unconstrained pushdown system P determines a rewrite relation→on the set of configurations: (X, w)→(Y, w') if there is a suffix s and a rule (X; u)c→(Y; v) such that w=us and wt=vs. The transitive closure of→is denoted *. With this definition, a key theorem behind the simplification algorithm of certain example embodiments can be stated as follows. Let C be a constraint set and V a set of base type variables, and define a subset SC of (V$\cup\Sigma$)*×(V$\cup\Sigma$)* by (Xu, Yv)$\in$SC if and only if C⊢X.u $\sqsubseteq$ Y.v. Then SC is a regular set, and an automaton Q to recognize SC can be constructed in O(|C|3) time. The proof for this theorem can be found in Noonan.

The example embodiments add at least two novelties: first, the example embodiments support contravariant stack symbols by encoding variance data into the control states and rewrite rules. The second novelty involves the rule S-POINTER; this rule is problematic since the natural encoding would result in infinitely many rewrite rules. The example embodiments extend Caucal's (see D. Caucal, "*On the regular structure of prefix rewriting*", Theoretical Computer Science, 106(1):61-86, 1992) construction to lazily instantiate all or substantially all necessary applications of S-POINTER during saturation. The details may be found in Noonan at Appendix D.

Since C will usually entail an infinite number of constraints, this theorem is particularly useful: it asserts that the full set of constraints entailed by C has a finite encoding by an automaton Q. Further manipulations on the constraint closure can be carried out on Q, such as efficient minimization. By restricting the transitions to and from #START and #END, the same algorithm is used to eliminate type variables, producing the desired constraint simplifications.

FIG. 1 illustrates a flowchart for type inference from a stripped binary according to some example embodiments. The process for type reconstruction 100 can be implemented on one or more computers in order to determine the type information for variables, constants etc., that are used in an input binary file which may be an executable file of one or more programs. FIG. 3 shows a block diagram of instruction logic components that can be used for implementing process 100, where the respective instruction logic components can be implemented as software, hardware or a combination of both. In some example embodiments, the type reconstruction, such as process 100, is implemented as a module within CodeSurfer® for Binaries. According to many embodiments, by leveraging the multi-platform disassembly capabilities of CodeSurfer®, the type reconstruction can operate on x86, x86-64, and ARM code.

At operation 102, a stripped binary is received. The example embodiments can take as input binaries generated by many compilers. For example, 32-bit x86 binaries for both Linux and Windows, compiled with a variety of gcc and Microsoft Visual C/C++ versions may be used as input. The input binaries may include a mix of executables, static libraries, and DLLs.

At operation 104, the input binary is disassembled to obtain an intermediate representation (IR). A disassembler such as, for example, GrammaTech's static analysis tool CodeSurfer® for Binaries be used to generate an IR of the input stripped binary. The CodeSurfer® operation is described in G. Balakrishnan, R. Gruian, T. Reps, and T. Teitelbaum, "*CodeSurfer/x86—a platform for analyzing x86 executables*", in Compiler Construction, pages 250-254. Springer, 2005. In some embodiments, minimal analysis settings, disabling VSA and nearly all points-to analysis and the like, may be used in the disassembly tool. Unlike conventional type inference algorithms such as TIE (see J. Lee, T. Avgerinos, and D. Brumley, "*TIE: Principled reverse engineering of types in binary programs*", in Proceedings of the 18th Annual Network and Distributed System Security Symposium (NDSS '11), 2011) and SecondWrite (see K. ElWazeer, K. Anand, A. Kotha, M. Smithson, and R. Barua, "*Scalable variable and data type detection in a binary rewriter*", in Proceedings of the 34th ACM SIGPLAN conference on Programming Language Design and Implementation (PLDI)", volume 48, pages 51-60. ACM, 2013), which require some modified form of VSA to resolve points-to data, example embodiments can recover high-quality types even from relatively weak points-to information, allowing type inference to proceed even when computing points-to data is too unreliable or expensive. CodeSurfer® performs common program analyses on binaries for multiple CPU architectures, and is used to recover a high-level IR from the raw machine code.

CodeSurfer® achieves platform independence through TSL. Interpreters for a given abstract domain are automatically created from the concrete semantics simply by specifying the abstract domain A and an interpretation of the concrete numeric and mapping types. In example embodiments, the CodeSurfer® output of the IR is specified in TSL, which is then processed for type reconstruction.

The IR may be in the form of disassembled code. An example disassembly IR is shown in the middle column of FIG. 6. The shown disassembly IR corresponds to the source code shown in the left column in the same figure. Although one example of an IR is illustrated, persons skilled in the art would appreciate that other intermediate forms of code can be used as the IR.

At operation 106, type constraints are generated. Certain example embodiments uses the recovered IR to determine the number and location of inputs and outputs to each procedure, as well as the program's call graph and per-procedure control-flow graphs. An abstract interpreter then generates sets of type constraints (at least in some example embodiments, per-procedure type constraint sets) from the concrete TSL instruction semantics.

The top right column of FIG. 6 illustrates a type scheme obtained according to example embodiments, from the disassembly shown in the middle column of the same figure. Among other things, the type scheme shows the tags #FileHandle and #SuccessZ that encode inferred higher level purposes. A sample of type constraints generated for the example program of FIG. 6, by applying abstract interpretation, is shown in FIG. 7. By generating type constraints from a TSL-based abstract interpreter, example embodiments can operate uniformly on binaries for any platform supported by CodeSurfer®, including x86, x86-64, and ARM. Some examples of constraint generation were described above, and additional details are described below in relation to FIG. 2. Further details of the abstract semantics for constraint generation can be found in Noonan at Appendix A.

At operation 108, resolved types are applied back to the IR and become visible to the GUI and later analysis phases. Applying types back to the IR makes them available as an input into further algorithms, such as decompilation or pointer analysis. The capability to apply certain inferred types to the IR enables new iterations of type inferring based on previous iterations, and provides for further consistency checking and iterative or recursive type inferring of certain complex types.

At operation 110 the reconstructed types are displayed on a display device or output in another manner (e.g., print, transmit to another application or store in a memory). Prior to output, the final phase of type resolution converts the inferred sketches to C types for presentation to the user. Since C types and sketches are not directly comparable, this resolution phase necessarily involves the application of heuristic conversion policies to approximate each of the inferred type by a respective C type. Restricting the heuristic policies to a single post-inference phase provides the example embodiments with substantial flexibility to generate high-quality, human-readable C types while maintaining soundness and generality during type reconstruction. The bottom right column of FIG. 6 illustrates an example reconstructed type. The corresponding source code, disassembly and generated type scheme are illustrated in the same figure left column, middle column, and top right column, respectively.

FIG. 2 illustrates an example process of generating type constraints from the IR, according to some example embodiments. In some example embodiments, process 200 may be performed during operation 106 shown in FIG. 1.

At operation 202, the example embodiments operate to determine inputs/outputs of each procedure, determine program call graph, and determine per-procedure control flow. This may be performed using a tool, such as CodeSurfer®, that can analyze the IR.

At operation 204, type constraints are generated. Example embodiments, using an abstract interpreter, generate one or more sets of type constraints from the TSL semantics of the IR and other determined information regarding the program such as inputs/outputs of each procedure, program call graph, and per-procedure control flow. The type constraint sets are generated in a bottom-up fashion over the strongly-connected components of the call graph. The bottom-up approach enables simplification of constraint sets as we go; when procedure X calls procedure Y, the simplified constraint set for Y is inserted into the constraint set for X. Whereas, one would expect this would lead to an exponential increase in the constraint set size, but simplification prevents this from happening. Pre-computed type schemes for externally linked functions may be inserted at this stage.

In some embodiments, type constraint generation is performed by a parameterized abstract interpretation $TYPE_A$, the parameter A itself being an abstract interpreter that is used to transmit additional analysis information such as, for example, reaching definitions, propagated constants, and value-sets (when available). As stated earlier in this document, if V denotes the set of type variables and C the set of type constraints, then the primitive TSL value-types and map-types for $TYPE_A$ are represented by $BASETYPE_{TYPEA} = BASETYPE_A \times 2^V \times 2^C$ and $MAP[\alpha, \beta]_{TYPEA} = MAP[\alpha, \beta]_A \times 2^C$.

Since type constraint generation is a syntactic, flow-insensitive process, flow sensitivity can be regained by pairing with an abstract semantics that carries a summary of flow-sensitive information. Parameterizing the type abstract interpretation by A enables factoring out the particular way in which program variables should be abstracted to types (e.g. static single assignment (SSA) form, reaching definitions, and the like).

With respect to register loads and stores the basic reinterpretations proceed by pairing with the abstract interpreter A. FIG. 11A illustrates an example IR form for a register function. A(reg, s) produces a type variable from the register reg and the A-abstracted register map s". Register loads are handled similarly as shown in FIG. 11B.

Suppose that A represents the concrete semantics for x86 and A(reg,) yields a type variable (reg, { }) and no additional constraints. Then the x86 expression mov ebx, eax is represented by the TSL expression regUpdate(S, EBX( ), regAccess(EAX( ), S)), where S is the initial state ($S_{conc}$, C). After abstract interpretation, C will become C∪{eax ⊑ ebx}.

In another example, suppose that A represents an abstract semantics that is aware of register reaching definitions, and define A(reg, s) by FIG. 11C where reaching-defs yields the set of definitions of reg that are visible from state s. Then $TYPE_A$ at program point q will update the constraint set C to C∪{eaxp ⊑ ebxq} if p is the lone reaching definition of EAX. If there are multiple reaching definitions P, then the constraint set will become C∪{eaxp ⊑ t|p∈P}∪{t ⊑ ebxq}.

FIGS. 11D and 11E illustrate reinterpretations of addition and subtraction operations by the abstract interpreted A. FIG. 11D show an example when x or y have statically determined constant values (e.g., when INT32(n) has a concrete numeric value). FIG. 11E shows an example of addition when neither operand is a statically determined constant. In this case, a fresh type variable is generated representing the result, and a 3-place constraint is generated for the type variable.

FIG. 11F shows an example reinterpretation of memory operations by the interpreter A. Memory accesses are treated similarly to register accesses, except for the use of dereference accesses and the handling of points-to sets. For any abstract A-value a and A-state s, let A(α,s) denote a set of type variables representing the address A in the context s. Furthermore, define PtsToA(α, s) to be a set of type variables representing the values pointed to by α in the contexts. The semantics of the N-bit load and store functions memAc-$cess_N$ and memUpdate$_N$ are shown in FIG. 11F. Acceptable results have been obtained by using a bare minimum points-to analysis that only tracks constant pointers to the local activation record or the data section. The use of the .load/.store accessors allows tracking of multi-level pointer information without the need for explicit points-to data. The minimal approach tracks just enough points-to information to resolve references to local and global variables.

With respect to procedure invocations, earlier occurring analysis phases are responsible for delineating procedures and gathering data about each procedure's formal-in and formal-out variables, including information about how parameters are stored on the stack or in registers. This data is transformed into a collection of locators associated to each function. Each locator is bound to a type variable representing the formal; the locator is responsible for finding an appropriate set of type variables representing the actual at a call-site, or the corresponding local within the procedure itself.

FIG. 11G illustrates a simple program in machine code that invokes a 32-bit identity function. The procedure id will have two locators: a locator $L_i$ for the single parameter, bound to a type variable $id_i$; and a locator $L_o$ for the single return value, bound to a type variable $id_o$.

At the procedure call-site, the locator $L_i$ will return the type variable $ext4_p$ representing the stack location ext4 tagged by its reaching definition. Likewise, $L_o$ will return the type variable $eax_q$ to indicate that the actual-out is held in the version of eax that is defined at point q. The locator results are combined with the locator's type variables, resulting in the constraint set $\{id_i \sqsubseteq arg0_{id}, eax_r \sqsubseteq id_0\}$. The interpretations of various operations are described in more detail in Noonan, in Appendix A. FIGS. 11A-11G show pseudocode for one partial implementation of an interpreter A. FIG. 11F shows how points-to data can be incorporated; FIGS. 11D, 11E show how additive constraints can be incorporated; FIGS. 11A, 11B, 11C show how incorporating reaching-definition data can be used when generating type constraints for registers.

By changing the parametric interpreter A, the generated type constraints may be made more precise. The interpreter A might be slow but very precise, or fast but relatively imprecise. Different implementations may weigh these factors differently, leading to different choices about A.

At operation 208, the generated initial constraints are simplified. Each constraint set may be simplified by eliminating type variables that do not belong to a predetermined interface (e.g., the source code control system (SCCS) interface). Another simplification is to introduce a new intermediate type variable in order to replace N*M constraints with N+M constraints. For example, if all of $X_1, X_2, X_3, X_4$ are less than all of $Y_1, Y_2, Y_3$, we would need to introduce 4*3=12 constraints ($X_1<Y_1, X_2<Y_1, \ldots X_4<Y_3$). By adding one new variable V, we can use only 4+3=7 constraints ($X_1<V, X_2<V, X_3<V, X_4<V$, and $V<Y_1, V<Y_2, V<Y_3$). An example simplification algorithm is shown in FIG. 10.

The simplification may utilize a transducer Q constructed from the initial type constraints. According to come embodiments, from the initial type constraints, a pushdown system $P_c$ is constructed. The pushdown system $P_c$ is constructed so that its derivations model proofs in C. Noonan, which is incorporated by reference, describes the construction of the pushdown system $P_c$ in detail in Appendix D. As described in Noonan, during the construction of $P_c$, some classes of rules (where the rules are derived from constraints), which have relatively large numbers of rules compared to other classes, may be considered lazily while other classes with lesser number of rules are considered in a more frequent manner.

The pushdown system $P_c$ is used to construct a finite state automaton $A_c$. The finite state automaton $A_c$ is constructed to accept strings that encode some of the behavior of $P_c$. Noonan describes the construction of $A_c$ in Appendix D.2.

The finite state automaton $A_c$ and a saturation algorithm is then used to form a finite state transducer $A_{c\text{-}sat}$. $A_{c\text{-}sat}$ is constructed to have the simple structure of building up a pop sequence representing an initial state of the pushdown automaton, then building up a push sequence representing a final state. In order to achieve this result, $A_c$ is saturated by a technique such as that shown in FIG. 12. The intermediate terms of the form "push u, then pop it again" are unwieldy, and although accepted by $A_c$, they are not accepted by $A_{c\text{-}sat}$. To remove the necessity for those sequences, $A_c$ is saturated by adding additional labeled transitions providing shortcuts to the push/pop subsequences. The saturation algorithm is configured to lazily instantiate transitions which correspond to uses of the S-POINTER-derived rules in point-to constraints. This enables the saturation to operate even though the corresponding pushdown system may have infinitely many rules. Noonan, at appendix D.3, provides further details of constructing $A_{c\text{-}sat}$.

The transducer Q is then formed from the finite state transducer $A_{c\text{-}sat}$. FIG. 14 Algorithm D.1 illustrates pseudocode for constructing Q. The automaton $A_{c\text{-}sat}$ now accepts push/pop sequences representing the changes in the stack during any valid (e.g., permitted) derivation in the pushdown system Δ. After saturation, it can be guaranteed that every derivation is represented by a path which first pops a sequence of tokens, then pushes another sequence of tokens. A productive transition sequence must consist of a sequence of pop edges followed by a sequence of push edges. Unfortunately $A_{c\text{-}sat}$ still accepts unproductive transition sequences which push and then immediately pop token sequences. To complete the construction, an automaton Q may be formed by intersecting $A_{c\text{-}sat}$ with an automaton for the language of words consisting of only pops, followed by only pushes. This ensures that Q only accepts the productive transition sequences in $A_{c\text{-}sat}$. Noonan, at appendix D.4, provides further details of constructing Q.

The transducer Q may be used in embodiments in two places during type analysis: first, by computing Q relative to the type variable of a function, a transducer is obtained that represents all elementary derivations of relationships between the function's inputs and outputs. FIG. 15 illustrates an example algorithm used to convert the transducer Q back to a pushdown system $P_c$, such that Q describes all valid derivations in $P_c$. Then the rules in $P_c$ can be interpreted as subtype constraints, resulting in a simplification of the constraint set relative to the formal type variables.

The type simplification stage may result in types that are very general. Often, this means that types are found to be more general than is strictly helpful to an observer, which may be a human observer or another program/machine. A policy referred to herein as REFINEPARAMETERS can used to specialize type schemes to the most specific scheme that is compatible with all uses. For example, a C++ object may include a getter function with a highly polymorphic type scheme, since it could operate equally well on any structure with a field of the right type at the right offset. But it may be expected that in every calling context, the getter will be called on a specific object type (or perhaps its derived types). By specializing the function signature, contextual clues are made use of in exchange for generality before presenting a final C type to the user. The example function REFINEPARAMETERS shown in FIG. 16 is used to specialize each function's type sufficiently to match how the function is actually used in a program, at the cost of reduced generality.

At operation 208 sketches are assigned to type variables, and type schemes are specialized based on calling context. Once type schemes are available, the call graph is traversed bottom-up, assigning sketches to type variables. During this stage, type schemes are specialized based on the calling contexts of each function.

By computing Q relative to the set of type constants a transducer can be obtained that can be efficiently queried to determine which derived type variables are bound above or below by which type constants. This is used by the SOLVE procedure shown in pseudocode in FIG. 13 to populate lattice elements decorating the inferred sketches.

The inventors found that adding these decorations (e.g., markings from the lattice) to the sketches helped preserve high-level types of interest to the end user during type inference. This allows recovery of high-level C and Windows typedefs such as size_t, FILE, HANDLE, and SOCKET that are useful for program understanding and reverse engineering.

Decorations also enable a simple mechanism by which the user can extend the example embodiments' type system, adding semantic purposes (e.g., referred to sometimes as "purpose constraints") to the types for known functions. For example, A can be extended to add seeds for a tag #signal-number attached to the less-informative int parameter to signal( ). This approach also allows us to distinguish between opaque typedefs and the underlying type, as in HANDLE and void*. Since the semantics of a HANDLE are quite distinct from those of a void*, it is important to have a mechanism that can preserve the typedef name.

Sketches is the choice of entity for modeling solutions to the constraint sets in example embodiments. An advantage of sketches may be that they are almost a free tree model of the constraint language. Any constraint set C is satisfiable over the lattice of sketches, as long as C cannot prove an impossible subtype relation in Λ. The same pushdown system construction that appears during constraint simplification to answer queries about which type constants are upper and lower bounds on a given derived type variable may be used for labeling lattices. The computation of upper and lower lattice bounds on a derived type variable can be found in Noonan at Appendix D.4.

Figure 18A:
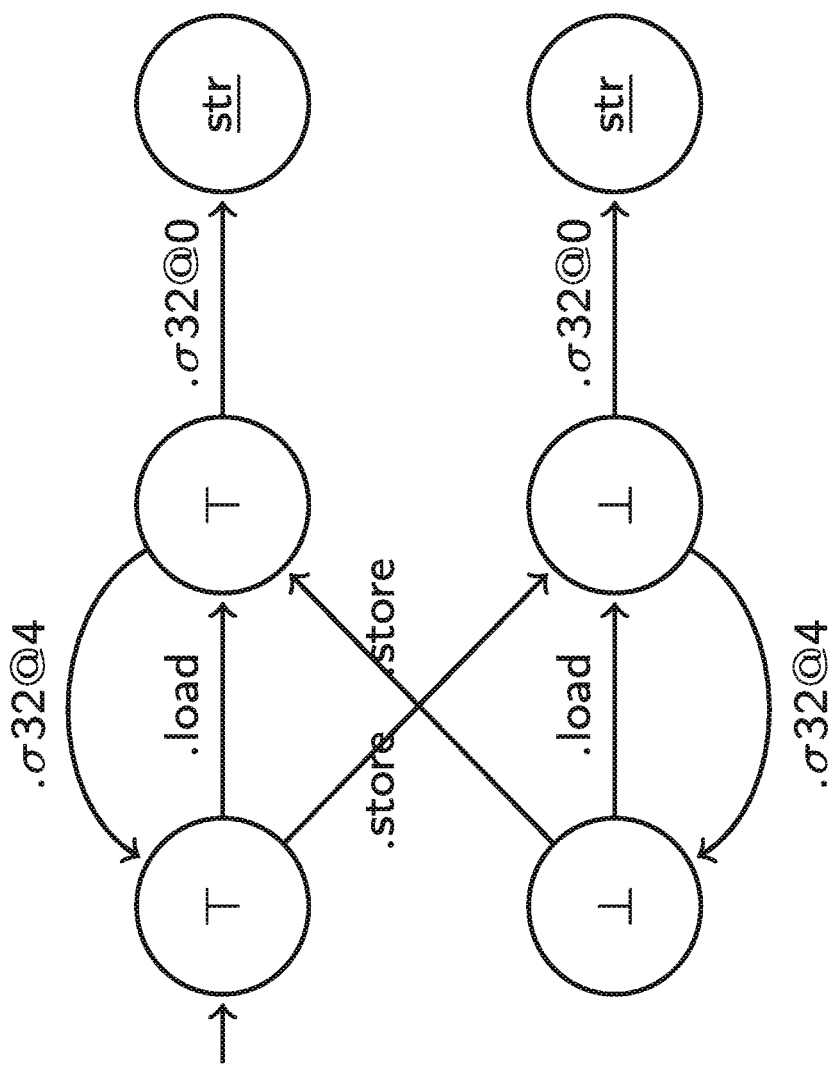
FIGS. 18A and 18B illustrate example sketches according to some embodiments.
Figure 18B:
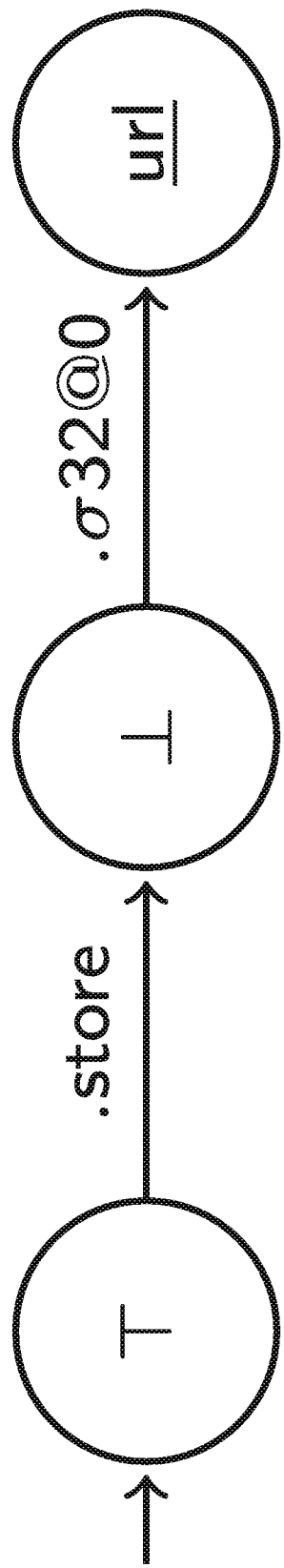
Figures 19, 20:
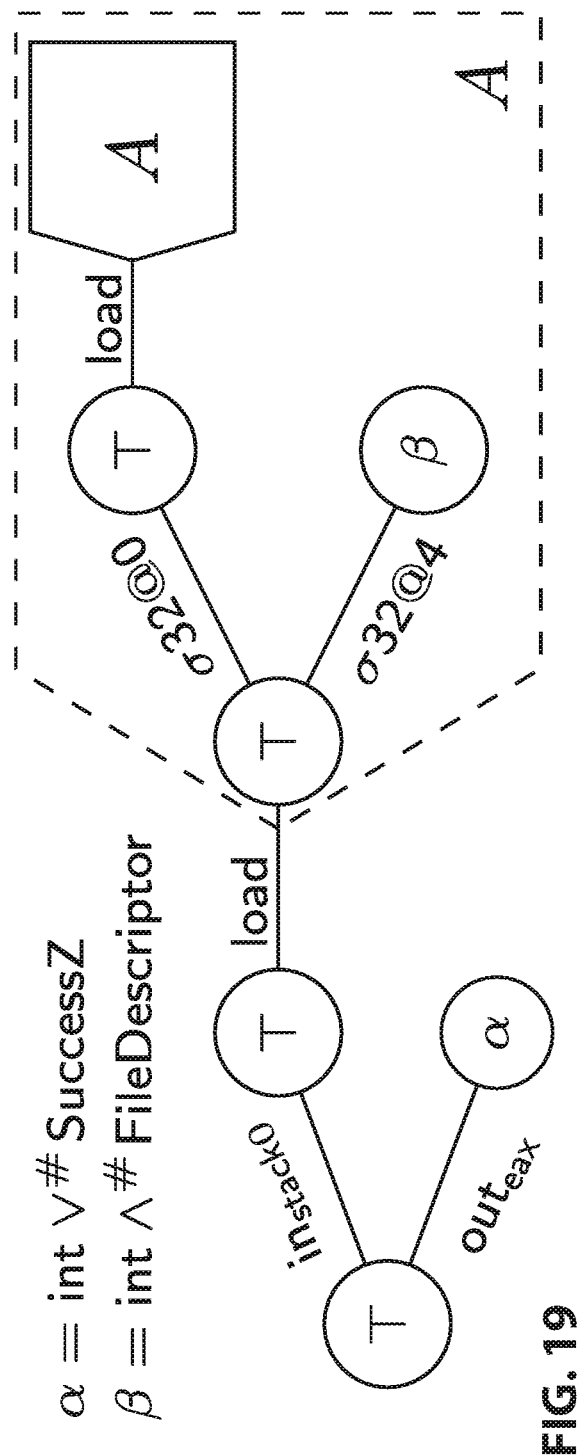
FIG. 19 illustrates a sketch instantiating a type scheme in FIG. 6, according to some embodiments.
FIG. 20 illustrates example machine code for void $f$(int x, char*y) invoked as $f$(0, NULL).

FIG. 17 illustrates pseudocode for an example sketch generation process for use in at least some example embodiments. FIGS. 18A and 18B show example sketches. FIG. 18A is a sketch representing a linked list of strings struct LL{str s; struct LL*α;}*. FIG. 18A shows a sketch as a deterministic finite state automata with each state labeled by an element from Λ. This automatic may be formed by collapsing equal subtrees that makeup the sketch. FIG. 18B shows another example sketch. FIG. 15 produces the input to FIG. 14 (the set of pushdown system rules delta). FIG. 19 is the sketch (in the sense of the paper) that solves the constraint set in the upper-right corner of FIG. 6. Converting FIG. 19 to C types results in the types shown in the bottom-right of FIG. 6. Details of the sketch in FIG. 18A can be found in Noonan at Appendix E. FIG. 19 illustrates a sketch instantiating the type scheme in FIG. 6.

At operation 210, convert inferred sketches to C types applying heuristic conversion policies. The final phase of type resolution converts the inferred sketches to C types for presentation to the user. Sketches are traversed top-down, applying heuristics. For example, if a sketch node has outgoing "load" or "store" edges, then we create a C pointer type. The pointed-to type will then be derived by applying the heuristics to the target of the "load" or "store" edge. Similarly, if a type is accessed at several different offsets, we create a C struct type with fields at the corresponding offsets. Cycles in the sketch correspond to recursive types, so we will create C structs with recursive fields when a cycle is traversed. Since C types and sketches are not directly comparable, this resolution phase necessarily involves the application of heuristic conversion policies. Other heuristics include forming union types when the sketch conforms to the shape of two or more different C types. Restricting the heuristic policies to a single post-inference phase provides the example embodiments with substantial flexibility to generate high-quality, human-readable C types while maintaining soundness and generality during type reconstruction.

FIG. 3 shows a block diagram illustrating the instruction logic components providing for the processes 100 and 200. A processing component 300 includes a disassembling instruction logic component 302, type reconstruction instruction logic 304, rule instruction logic 306, and type heuristics instruction logic 308. Components 302-308 may be implemented in software, or using a combination of software hardware. Instruction logic component 302 may comprise a disassembler such as, for example, CodeSurfer®. Type reconstruction instruction logic 304 may include the logic for processes 100 and 200. Rule instruction logic 306 includes the logic for implementing the rules for constraint creation and for inference. The type heuristic logic 308 includes instruction logic for implementing the heuristic rules for converting the inferred types to C types (other program language types). Components 302-308 may be stored on a persistent memory of a computer when not in use, and may, at least partially, be loaded into the volatile memory of the computer when active.

The intermediate representation 310 may be generated by the disassembling component 302, and stored in the volatile memory of the computer. Reconstructed type information 312 may be stored on persistent or volatile memory, and may be either displayed to a display of the computer or output by a network or other interface of the computer.

It will be appreciated that certain example embodiments may run in connection with a standalone or networked computer and/or computer system comprising a plurality of computer nodes. In an example runtime environment, for example, an instance of a process for hardening application programs according to an embodiment may run in memory. Components may include, for example, memory, at least one processor, a data store, an OS kernel, etc. It will be appreciated that such an environment may be used in connection with, or be simply backed by an embodiment as shown in FIGS. 1-3. It also will be appreciated that certain example embodiments may work in any design time and/or runtime environment including, for example, Windows, Linux, Unix, MacOS, and/or other operating systems present on the example electronic devices mentioned above. In a similar vein, the techniques described herein may be used in any suitable combination, sub-combination, or combination of sub-combinations, e.g., as appropriate to the programming language, runtime environment, etc. With respect to the former, for example, certain example embodiments may be made to work with programming languages including, for example, C, C++, Assembler, Java, etc. The programming language may be a compiled or interpreted language, and may run on a physical or virtual machine.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of inferring types from a program, the method comprising:
    receiving a low-level programming language representation of the program;
    generating an intermediate representation of the low-level programming language representation;
    generating a plurality of type constraints from the intermediate representation;
    inferring types based on the plurality of type constraints;
    converting the inferred types to types appropriate for a second programming language, the second programming language being at a level higher than the low-level programming language representation;
    updating the intermediate representation by applying the inferred types to the intermediate representation; and
    causing the inferred types, the converted types appropriate for the second programming language, and/or at least a portion of the updated intermediate representation, to be output;
    wherein the inferring of the types comprises assigning a sketch to each of the inferred types,
    wherein each sketch is converted to one or more of said types appropriate for the second programming language, and
    wherein each sketch includes a record indicating a capability, type variable, and/or type constant of the inferred type to which the respective sketch is assigned.

2. The method according to claim 1, further comprising enabling an end user to define and/or adjust an initial type hierarchy at run time via a user interface.

3. The method according to claim 1, wherein the type constraints are generated in a bottom-up fashion over strongly-connected components of a call graph, and wherein sketches are assigned to type variables while the call graph is being traversed bottom-up.

4. The method according to claim 1, wherein the generating of the type constraints includes creating a simplified plurality of type constraints by operations including lazily evaluating pointer derived constraints, while non-lazily evaluating other constraints.

5. A non-transitory computer-readable storage medium having instruction stored therein to, when executed by at least one processor of a computer, cause the computer to perform operations comprising:

receiving a low-level programming language representation of a program;
generating an intermediate representation of the low-level programming language representation;
generating a plurality of type constraints from the intermediate representation;
inferring types based on the plurality of type constraints;
converting the inferred types to types appropriate for a second programming language, the second programming language being at a level higher than the low-level programming language representation;
updating the intermediate representation by applying the inferred types to the intermediate representation; and
causing the inferred types, the converted types appropriate for the second programming language, and/or at least a portion of the updated intermediate representation, to be output;
wherein the inferring of types comprises assigning a sketch to each of the inferred types,
wherein each sketch is converted to one or more of the types appropriate for the second programming language, and
wherein each sketch includes a record indicating a capability, type variable, and/or type constant of the inferred type to which the respective sketch is assigned.

6. A computing system, comprising:
at least one memory, and
at least one processor configured to execute functionality comprising:
  receiving a low-level programming language representation of a program;
  generating an intermediate representation of the low-level programming language representation;
  generating a plurality of type constraints from the intermediate representation;
  inferring types based on the plurality of type constraints;
  converting the inferred types to types appropriate for a second programming language, the second programming language being at a level higher than the low-level programming language representation;
  updating the intermediate representation by applying the inferred types to the intermediate representation; and
  causing output of the inferred types, the converted types appropriate for the second programming language, and/or at least a portion of the updated intermediate representation,
wherein the inferring of the types comprises assigning a sketch to each of said inferred types,
wherein each sketch is converted to one or more of the types appropriate for the second programming language, and
wherein each sketch includes a record indicating a capability, type variable, and/or type constant of the inferred type to which the respective sketch is assigned.

7. The computing system according to claim 6, wherein the converting of the inferred types is performed after the inferred types are generated from the intermediate representation.

8. The computing system according to claim 6, wherein each sketch is represented by a tree data structure, and wherein edges of the tree data structures represent labels corresponding to the capabilities and nodes of the tree data structures represent the type variables and/or the type constants.

9. The computing system according to claim 6, wherein assigned sketches are arranged in a lattice formed by markings relating respective sketches to one or more other sketches.

10. The computing system according to claim 9, wherein a given type constraint is represented in the lattice by a path from the root with a label sequence.

11. The computing system according to claim 9, wherein at least one of the markings is configured to encode higher level information including typedef name information.

12. The computer system according to claim 6, wherein the generating of the plurality of type constraints from the intermediate representation comprises at least one of (A) determining inputs/outputs of each procedure, (B) determining a program call graph, and (C) determining per-procedure control flow.

13. The computing system according to claim 12, wherein the at least one processor is further configured to execute functionality comprising generating sets of type constraints from concrete TSL semantics, inserting type schemes for externally linked functions, and simplifying each constraint set.

14. The computing system according to claim 13, wherein the at least one processor is further configured to execute functionality comprising assigning sketches to type variables, and specializing type schemes based on calling contexts.

15. The computing system according to claim 14, wherein the at least one processor is further configured to execute functionality comprising applying heuristic conversion policies to convert inferred sketches to types appropriate for the second programming language.

16. The computing system according to claim 6, wherein the inferring of the types is based on subtyping and/or interpreting recursive data structures.

17. The computing system according to claim 6, further comprising a user interface enabling an end user to define and/or adjust an initial type hierarchy at run time.

18. The computing system according to claim 6, wherein the type constraints are generated in a bottom-up fashion over strongly-connected components of a call graph, and wherein sketches are assigned to type variables while the call graph is being traversed bottom-up.

19. The computing system according to claim 6, wherein the generating of the type constraints includes creating a simplified plurality of type constraints by lazily evaluating pointer derived constraints, while non-lazily evaluating other constraints.

20. The computing system according to claim 6, wherein the low-level programming language representation comprises machine code.

* * * * *